(12) United States Patent
Ji et al.

(10) Patent No.: US 10,050,523 B1
(45) Date of Patent: Aug. 14, 2018

(54) VOLTAGE CONVERSION CIRCUIT AND LIQUID CRYSTAL DISPLAY DRIVING CHIP

(71) Applicant: Wuhan China Star Optoelectronics Technology Co., Ltd., Wuhan, Hubei (CN)

(72) Inventors: Feilin Ji, Guangdong (CN); Xiaoping Tan, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 194 days.

(21) Appl. No.: 15/125,575

(22) PCT Filed: Jul. 29, 2016

(86) PCT No.: PCT/CN2016/092324
§ 371 (c)(1),
(2) Date: Sep. 12, 2016

(87) PCT Pub. No.: WO2018/010221
PCT Pub. Date: Jan. 18, 2018

(30) Foreign Application Priority Data

Jul. 15, 2016 (CN) .......................... 2016 1 0559861

(51) Int. Cl.
*H02M 3/07* (2006.01)
*G09G 3/36* (2006.01)
(52) U.S. Cl.
CPC .............. *H02M 3/073* (2013.01); *G09G 3/36* (2013.01); *G09G 2330/021* (2013.01)

(58) Field of Classification Search
CPC .... H02M 3/073; G09G 3/36; G09G 2330/021
See application file for complete search history.

(56) References Cited

U.S. PATENT DOCUMENTS

| 6,107,871 A | * | 8/2000 | Shin | ...................... H03H 19/004 327/552 |
| 7,518,892 B2 | * | 4/2009 | Kitagawa | ................ H02M 3/07 363/59 |

(Continued)

FOREIGN PATENT DOCUMENTS

| CN | 101765963 A | 6/2010 |
| CN | 201904721 U | 7/2011 |

(Continued)

*Primary Examiner* — Dmitriy Bolotin
(74) *Attorney, Agent, or Firm* — Andrew C. Cheng

(57) ABSTRACT

The embodiment of the present disclosure provides a voltage conversion circuit including a voltage conversion module and a control module, the voltage conversion module includes a input terminal, a first capacitor, a second capacitor, a third capacitor, a fourth capacitor, a first switch to thirteenth switch and a output terminal, the input terminal is used to connect the input power, the control module is connected with the voltage conversion module, the voltage conversion module is used to convert the voltage of the input power to different magnifications output voltage and output from the output terminal when the first capacitor, the second capacitor, the third capacitor and the fourth capacitor are charging and discharging. Further, the embodiment of the present disclosure further provides a liquid crystal display driving chip applied the voltage conversion circuit. The voltage conversion circuit may achieve multi-magnification voltage output, and improve the conversion efficiency of the voltage.

20 Claims, 14 Drawing Sheets

(56) References Cited

U.S. PATENT DOCUMENTS

| | | | | |
|---|---|---|---|---|
| 8,295,064 B2* | 10/2012 | Shiwaya | ................. | H02M 3/07 |
| | | | | 327/536 |
| 8,503,203 B1 | 8/2013 | Szczeszynski et al. | | |
| 9,413,362 B2* | 8/2016 | Englekirk | ............. | H03L 7/0891 |
| 2010/0188065 A1* | 7/2010 | Shiwaya | ................. | H02M 3/07 |
| | | | | 323/299 |
| 2011/0084756 A1* | 4/2011 | Saman | .................... | H02M 3/07 |
| | | | | 327/536 |
| 2011/0234652 A1* | 9/2011 | Lee | ...................... | G09G 3/3696 |
| | | | | 345/690 |
| 2011/0317456 A1* | 12/2011 | Tseng | ................... | H02M 3/073 |
| | | | | 363/60 |
| 2015/0002214 A1 | 1/2015 | Englekirk | | |
| 2017/0055322 A1* | 2/2017 | Jiang | ...................... | H02M 3/07 |

FOREIGN PATENT DOCUMENTS

| | | | |
|---|---|---|---|
| CN | 104410271 A | | 3/2015 |
| CN | 104781745 A | | 7/2015 |
| WO | 2009060699 A1 | | 5/2009 |

\* cited by examiner

| Mode | | S9 | S14 | S1 | S2 | S3 | S4 | S5 | S6 | S7 | S8 | S10 | S11 | S12 | S13 |
|---|---|---|---|---|---|---|---|---|---|---|---|---|---|---|---|
| 1.17 | Charge | 1 | 0 | 0 | 0 | 0 | 0 | 1 | 1 | 1 | 1 | 0 | 0 | 0 | 0 |
| | Discharge | 0 | 0 | 0 | 0 | 0 | 1 | 0 | 0 | 0 | 1 | 0 | 0 | 0 | 1 |
| 1.20 | Charge | 1 | 0 | 0 | 0 | 0 | 1 | 0 | 1 | 1 | 0 | 0 | 0 | 0 | 0 |
| | Discharge | 0 | 0 | 0 | 1 | 0 | 0 | 0 | 1 | 0 | 0 | 0 | 1 | 0 | 0 |
| 1.33 | Charge | 1 | 0 | 0 | 0 | 0 | 0 | 1 | 1 | 1 | 1 | 0 | 0 | 0 | 0 |
| | Discharge | 0 | 0 | 1 | 0 | 0 | 0 | 0 | 0 | 0 | 0 | 1 | 0 | 0 | 0 |
| 1.40 | Charge | 1 | 0 | 0 | 0 | 0 | 1 | 0 | 1 | 1 | 0 | 0 | 0 | 0 | 0 |
| | Discharge | 0 | 0 | 1 | 0 | 0 | 0 | 0 | 0 | 0 | 0 | 1 | 0 | 0 | 0 |
| 1.50 | Charge | 1 | 0 | 0 | 0 | 0 | 0 | 1 | 1 | 1 | 1 | 0 | 0 | 0 | 0 |
| | Discharge | 0 | 0 | 1 | 0 | 0 | 0 | 0 | 1 | 0 | 0 | 0 | 1 | 0 | 0 |
| 1.60 | Charge | 1 | 0 | 0 | 0 | 0 | 1 | 0 | 1 | 1 | 0 | 0 | 0 | 0 | 0 |
| | Discharge | 0 | 0 | 1 | 0 | 0 | 0 | 0 | 1 | 0 | 0 | 0 | 1 | 0 | 0 |
| 1.67 | Charge | 1 | 0 | 0 | 0 | 1 | 0 | 0 | 1 | 0 | 0 | 0 | 0 | 0 | 0 |
| | Discharge | 0 | 0 | 1 | 0 | 0 | 0 | 0 | 0 | 0 | 0 | 1 | 0 | 0 | 0 |
| 1.83 | Charge | 1 | 0 | 0 | 0 | 0 | 0 | 1 | 1 | 1 | 1 | 0 | 0 | 0 | 0 |
| | Discharge | 0 | 0 | 1 | 0 | 0 | 0 | 0 | 1 | 1 | 0 | 0 | 0 | 1 | 0 |
| 2.00 | Charge | 1 | 0 | 0 | 1 | 0 | 0 | 0 | 0 | 0 | 0 | 0 | 0 | 0 | 0 |
| | Discharge | 0 | 0 | 1 | 0 | 0 | 0 | 0 | 0 | 0 | 0 | 1 | 0 | 0 | 0 |
| 2.33 | Charge | 1 | 1 | 0 | 0 | 1 | 1 | 0 | 1 | 0 | 0 | 0 | 0 | 0 | 0 |
| | Discharge | 0 | 0 | 0 | 1 | 0 | 0 | 0 | 1 | 1 | 0 | 0 | 0 | 1 | 0 |
| 2.67 | Charge | 1 | 1 | 0 | 0 | 1 | 0 | 1 | 1 | 0 | 1 | 0 | 0 | 0 | 0 |
| | Discharge | 0 | 0 | 1 | 0 | 0 | 0 | 0 | 1 | 1 | 0 | 0 | 0 | 1 | 0 |
| 3.00 | Charge | 1 | 1 | 0 | 0 | 1 | 0 | 1 | 1 | 0 | 1 | 0 | 0 | 0 | 0 |
| | Discharge | 0 | 0 | 1 | 0 | 0 | 0 | 0 | 1 | 1 | 1 | 0 | 0 | 0 | 1 |

FIG. 26

VOLTAGE CONVERSION CIRCUIT AND LIQUID CRYSTAL DISPLAY DRIVING CHIP

CROSS REFERENCE

The present disclosure claims the priority of No. 201610559861.2, entitled "Voltage conversion circuit and liquid crystal display driving chip", filed on Jul. 15, 2016, the disclosure of which is incorporated herein by reference in its entirety.

FIELD OF THE DISCLOSURE

The present disclosure relates to a liquid crystal display technology field, and more particularly to a voltage conversion circuit and a liquid crystal display driving chip.

BACKGROUND OF THE DISCLOSURE

With the continuous development of the liquid crystal display technology, smart phones, tablets and other portable intelligent terminal with its thin and intelligent features becoming regular consumers demand. With smart phones, tablets and other portable intelligent terminal becoming increasingly popular, their use in daily life scenes are increasingly being used, for example, receive calls, Internet access, reading and entertainment, etc. At present, the power problem has limited the use time of smart phones, so in the smart phone system, the power conversion efficiency is crucial. The liquid crystal display (LCD) module as a large power of the smart phone, the power conversion efficiency is directly related to the energy consumption of the smart phone system. On LCD module, generally only input two or three power supply voltage, then converting the required various voltage through the integrated charge pump in the driving chip and obtaining the required voltage through the low dropout regulator (LDO). However, this approach is likely to be limited by the charge pump structure, usually only two or three modes for switching to obtain a fixed magnification voltage; meanwhile, with the complexity of the required voltage, and after the conversion of the charge pump and the regulation of the LDO, the power conversion efficiency becomes very low.

SUMMARY OF THE DISCLOSURE

The embodiment of the present disclosure provides a voltage conversion circuit and a liquid crystal display driving chip applied the voltage conversion circuit to achieve the conversion of the voltage of the input power to a plurality of output voltage ratio, and improve the power conversion efficiency.

A voltage conversion circuit includes a voltage conversion module and a control module;

the voltage conversion circuit includes a input terminal, a first capacitor, a second capacitor, a third capacitor, a fourth capacitor, a first switch, a second switch, a third switch, a fourth switch, a fifth switch, a sixth switch, a seventh switch, an eighth switch, a ninth switch, a tenth switch, an eleventh switch, a twelfth switch, a thirteenth switch and a output terminal;

the one end of the first switch, the second switch, the third switch, the fourth switch and the fifth switch are connected with the input terminal, the other end of the first switch is connected with the one end of the first capacitor and the one end of the ninth switch, the other end of the ninth switch is grounded, the other end of the first capacitor is connected with the other end of the second switch, the one end of the sixth switch and the one end of the tenth switch, the other end of the sixth switch is connected with the one end of the second capacitor, the other end of the tenth switch is connected with the one end of the eleventh switch, the one end of the twelfth switch, the one end of the thirteenth switch and the output terminal, the other end of the second capacitor is connected with the other end of the third switch, the other end of the eleventh switch and the one end of the seventh switch, the other end of the seventh switch is connected with the one end of the third capacitor, the other end of the third capacitor is connected with the other end of the fourth switch, the other end of the twelfth switch and the one end of the eighth switch, the other end of the eighth switch is connected with the one end of the fourth capacitor, the other end of the fourth capacitor is connected with the other end of the fifth switch and the other end of the thirteenth switch;

the input terminal is used to connect the input power, the control module is connected with the voltage conversion module and is used to control the first switch to the thirteenth switch turned on or off, the voltage conversion module is used to convert the voltage of the input power to different magnifications output voltage and output from the output terminal when the first capacitor, the second capacitor, the third capacitor and the fourth capacitor are charging and discharging.

Wherein, when the fifth switch, the sixth switch, the seventh switch, the eighth switch and the ninth switch are turned on and the rest of the switches are turned off, the input power is charging the first capacitor, the second capacitor, the third capacitor and the fourth capacitor; when the fourth switch, the eighth switch and the thirteenth switch are turned on and the rest of the switches are turned off, the voltage difference across the fourth capacitor is equal to $1/6$ times of the voltage of the input power, the output voltage is equal to $7/6$ times of the voltage of the input power.

Wherein, when the fourth switch, the sixth switch, the seventh switch and the ninth switch are turned on and the rest of the switches are turned off, the input power is charging to the first capacitor, the second capacitor and the third capacitor; when the second switch, the sixth switch and the eleventh switch are turned on and the rest of the switches are turned off, the voltage difference across the second voltage is equal to $1/5$ times of the voltage of the input power, the output voltage is equal to $6/5$ times of the voltage of the input power.

Wherein, when the fifth switch, the sixth switch, the seventh switch, the eight switch and the ninth switch are turned on and the rest of the switches are turned off, the input power is charging to the first capacitor, the second capacitor, the third capacitor and the fourth capacitor; when the first switch and the tenth switch are turned on and the rest of the switches are turned off, the voltage difference across the first capacitor is equal to $1/3$ times of the voltage of the input power, the output voltage is equal to $4/3$ times of the voltage of the input power.

Wherein, when the fourth switch, the sixth switch, the seventh switch and the ninth switch are turned on and the rest of the switches are turned off, the input power is charging to the first capacitor, the second capacitor and the third capacitor; when the first switch and the tenth switch are turned on and the rest of the switches are turned off, the voltage difference across the first capacitor is equal to $2/5$ times of the voltage of the input power, the output voltage is equal to $7/5$ times of the voltage of the input power.

Wherein, when the fifth switch, the sixth switch, the seventh switch, the eighth switch and the ninth switch are turned on and the rest of the switches are turned off, the input power is charging to the first capacitor, the second capacitor, the third capacitor and the fourth capacitor; when the first switch, the sixth switch and the eleventh switch are turned on and the rest of the switches are turned off, the sum of the voltage difference across the first capacitor and the voltage difference across the second capacitor is equal to ½ times of the voltage of the input power, the output voltage is equal to 3/2 times of the voltage of the input power.

Wherein, when the fourth switch, the sixth switch, the seventh switch and the ninth switch are turned on and the rest of the switches are turned off, the input power is charging to the first capacitor, the second capacitor and the third capacitor; when the first switch, the sixth switch and the eleventh switch are turned on and the rest of the switches are turned off, the sum of the voltage difference across the first capacitor and the voltage difference across the second capacitor is equal to ⅗ times of the voltage of the input power, the output voltage is equal to 8/5 times of the voltage of the input power.

Wherein, when the third switch, the sixth switch and the ninth switch are turned on and the rest of the switches are turned off, the input power is charging to the first capacitor and the second capacitor; when the first switch and the tenth switch are turned on, and the rest of the switches are turned off, the voltage difference across the first capacitor is equal to ⅔ times of the voltage of the input power, the output voltage is equal to 5/3 times of the voltage of the input power.

Wherein, when the fifth switch, the sixth switch, the seventh switch, the eighth switch and the ninth switch are turned on and the rest of the switches are turned off, the input power is charging to the first capacitor, the second capacitor, the third capacitor and the fourth capacitor; when the first switch, the sixth switch, the seventh switch and the twelfth switch are turned on, and the rest of the switches are turned off, the sum of the voltage difference across the first capacitor, the voltage difference across the second capacitor and the voltage difference across the third capacitor is equal to ⅚ times of the voltage of the input power, the output voltage is equal to 11/6 times of the voltage of the input power.

Wherein, when the second switch and the ninth switch are turned on and the rest of the switches are turned off, the input power is charging to the first capacitor; when the first switch and the tenth switch are turned on and the rest of the switches are turned off, the voltage difference across the first capacitor is equal to the voltage of the input power, the output voltage is equal to 2 times of the voltage of the input power.

Wherein, the voltage conversion module further includes a fourteenth switch, the one end of the fourteenth switch is connected between the third capacitor and the seventh switch, the other end of the fourteenth switch is grounded, the control module is further used to control the fourteenth switch turned on or off.

Wherein, when the third switch, the fourth switch, the ninth switch and the fourteenth switch are turned on and the rest of the switches are turned off, the input power is charging to the first capacitor, the second capacitor and the third capacitor; when the second switch, the sixth switch, the seventh switch and the twelfth switch are turned on and the rest of the switches are turned off, the sum of the voltage difference across the second capacitor and the voltage difference across the third capacitor is equal to 4/3 times of the voltage of the input power, the output voltage is equal to 7/3 times of the voltage of the input power.

Wherein, when the third switch, the fifth switch, the sixth switch, the eighth switch, the ninth switch and the fourteenth switch are turned on, and the rest of the switches are turned off, the input power is charging to the first capacitor, the second capacitor, the third capacitor and the fourth capacitor; when the first switch, the sixth switch, the seventh switch and the twelfth switch are turned on and the rest of the switches are turned off, the sum of the voltage difference across the first capacitor, the voltage difference across the second capacitor and the voltage difference across the third capacitor is equal to 5/3 times of the voltage of the input power, the output voltage is equal to 8/3 times of the voltage of the input power.

Wherein, when the third switch, the fifth switch, the sixth switch, the eighth switch, the ninth switch and the fourteenth are turned on and the rest of the switches are turned off, the input power is charging to the first capacitor, the second capacitor, the third capacitor and the fourth capacitor; when the first switch, the sixth switch, the seventh switch, the eighth switch and the thirteenth switch are turned on and the rest of the switches are turned off, the sum of the voltage difference across the first capacitor, the voltage difference across the second capacitor, the voltage difference across the third capacitor and the voltage difference across the fourth capacitor is equal to 2 times of the voltage of the input power, the output voltage is equal to 3 times of the voltage of the input power.

Wherein, the capacitance of the first capacitor is equal to the capacitance of the third capacitor, the capacitance of the second capacitor is equal to the capacitance of the fourth capacitor, and the capacitance ratio of the first capacitor, the second capacitor, the third capacitor and the fourth capacitor is 1:2:1:2.

Wherein, the second capacitor is formed in parallel by the two first capacitors or the two third capacitors, the fourth capacitor is formed in parallel by the two third capacitors or the two first capacitors.

A liquid crystal display driving chip includes a voltage conversion circuit, the voltage conversion circuit includes a voltage conversion module and a control module;

the voltage conversion circuit includes a input terminal, a first capacitor, a second capacitor, a third capacitor, a fourth capacitor, a first switch, a second switch, a third switch, a fourth switch, a fifth switch, a sixth switch, a seventh switch, an eighth switch, a ninth switch, a tenth switch, an eleventh switch, a twelfth switch, a thirteenth switch and a output terminal;

the one end of the first switch, the second switch, the third switch, the fourth switch and the fifth switch are connected with the input terminal, the other end of the first switch is connected with the one end of the first capacitor and the one end of the ninth switch, the other end of the ninth switch is grounded, the other end of the first capacitor is connected with the other end of the second switch, the one end of the sixth switch and the one end of the tenth switch, the other end of the sixth switch is connected with the one end of the second capacitor, the other end of the tenth switch is connected with the one end of the eleventh switch, the one end of the twelfth switch, the one end of the thirteenth switch and the output terminal, the other end of the second capacitor is connected with the other end of the third switch, the other end of the eleventh switch and the one end of the seventh switch, the other end of the seventh switch is connected with the one end of the third capacitor, the other end of the third capacitor is connected with the other end of the fourth switch, the other end of the twelfth switch and the one end of the eighth switch, the other end of the eighth switch is connected with the one end of the fourth capacitor, the other end of the fourth capacitor is connected with the other end of the fifth switch and the other end of the thirteenth switch;

the input terminal is used to connect the input power, the control module is connected with the voltage conversion module and is used to control the first switch to the thirteenth switch turned on or off, the voltage conversion module is used to convert the voltage of the input power to different magnifications output voltage and output from the output terminal when the first capacitor, the second capacitor, the third capacitor and the fourth capacitor are charging and discharging.

Wherein, the voltage conversion module further includes a fourteenth switch, the one end of the fourteenth switch is connected between the third capacitor and the seventh switch, the other end of the fourteenth switch is grounded, the control module is further used to control the fourteenth switch turned on or off.

Wherein, the capacitance of the first capacitor is equal to the capacitance of the third capacitor, the capacitance of the second capacitor is equal to the capacitance of the fourth capacitor, and the capacitance ratio of the first capacitor, the second capacitor, the third capacitor and the fourth capacitor is 1:2:1:2.

Wherein, the second capacitor is formed in parallel by the two first capacitors or the two third capacitors, the fourth capacitor is formed in parallel by the two third capacitors or the two first capacitors.

The power conversion circuit through the first capacitor, the second capacitor, the third capacitor, the fourth capacitor and the first switch to thirteen switch, and through the control module controlling the first switch to thirteenth switch turned on or off to achieve the charging and discharging of the first capacitor, the second capacitor, the third capacitor and the fourth capacitor, realized the voltage of the input power converted to a variety of different magnifications of the output voltage, it is conducive to enhancing power conversion efficiency.

BRIEF DESCRIPTION OF THE DRAWINGS

In order to more clearly illustrate the embodiments or the prior art technical solutions embodiment of the present disclosure, it will implement the following figures for the cases described in the prior art or the need to use a simple introduction. Apparently, the following description the drawings are only some embodiments of the present disclosure, those of ordinary skill in speaking, without creative efforts of the premise, but also can derive other drawings from these drawings.

FIG. 26 is a switch truth table of the charge/discharge state of the voltage conversion circuit of the embodiment of the present disclosure provided.

DETAILED DESCRIPTION OF PREFERRED EMBODIMENTS

Figure 1:
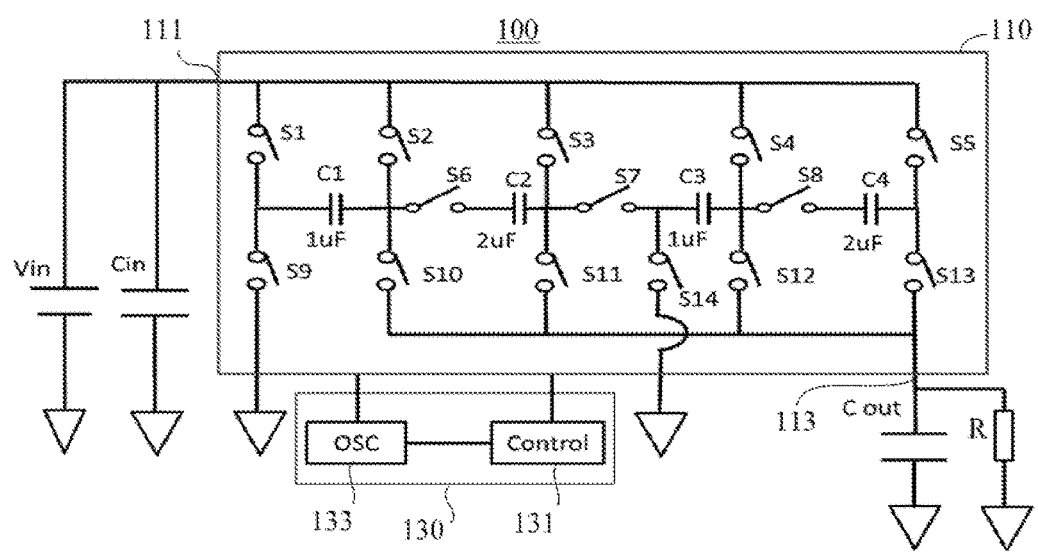
FIG. 1 is a schematic diagram of the voltage conversion circuit of the embodiment of the present disclosure provided.

The present disclosure will now be combined with the implementation of the accompanying drawings, were clear examples of technical solutions of the present disclosure, fully described, it is clear that the described embodiments are merely part of the embodiments of the present disclosure, but not all embodiments Example. Based on the embodiments of the present disclosure, those of ordinary skill in not making all other embodiments without creative efforts obtained, are within the scope of the present disclosure is protected.

For ease of description herein can be used, such as "beneath . . . ", "in . . . below", "lower", " . . . in the above", "upper" etc. as shown in the drawings to describe one element or feature to another (some) elements or characteristics of the relationship between the spatial relative terms. Be understood that when an element or layer is referred to another element or layer "on", "connected to" or "coupled to" another element or layer, it can be directly on another element or layer, directly connected or coupled to the other element or layer or intervening elements or layers may be present. In contrast, when an element is "directly on" another element or layer, "directly connected to" or "directly coupled to" another element or layer, intervening elements or layers present.

Will be appreciated, the terminology used herein is for describing particular embodiments only case, not intended to limit the present disclosure. When used herein, unless the context otherwise expressly stated herein, the singular forms "a" and "the" are intended to include the plural forms. Further, when used in this specification, the term "includes" and/or "including" indicates that the presence of features, integers, steps, components, and/or components, but do not exclude one or more other features, integers, steps, elements, components, and/or combinations of the presence or addition.

Unless otherwise defined, all terms used herein the same meaning (including technical and scientific terms) have ordinary skill in the art to which this disclosure as commonly understood. Will be further understood that terms such as Universal Dictionary defined otherwise, should be interpreted as having a meaning in the context of the relevant art consistent with their meaning, and should not be interpreted in an idealized or overly formal sense, unless expressly so defined.

Please refer to FIG. 1, the first embodiment of the present disclosure provides a voltage conversion circuit 100 including a voltage conversion module 110 and a control module 130;

the voltage conversion module 110 includes a input terminal 111, a first capacitor C1, a second capacitor C2, a third capacitor C3, a fourth capacitor C4, a first switch S1, a second switch S2, a third switch S3, a fourth switch S4, a fifth switch S5, a sixth switch S6, a seventh switch S7, an eighth switch S8, a ninth switch S9, a tenth switch S10, a eleventh switch S11, a twelfth switch S12, a thirteenth switch S13, a fourteenth switch S14 and a output terminal 113;

the one end of the first switch S1, the second switch S2, the third switch S3, the fourth switch S4 and the fifth switch S5 are connected with the input terminal 111, the other end of the first switch S1 is connected with the one end of the first capacitor C1 and the one end of the ninth switch S9, the other end of the ninth switch S9 is grounded, the other end of the first capacitor C1 is connected with the other end of the second switch S2, the one end of the sixth switch S6 and the one end of the tenth switch S10, the other end of the sixth switch S6 is connected with the one end of the second capacitor C2, the other end of the tenth switch S10 is connected with the one end of the eleventh switch S11, the one end of the twelfth switch S12, the one end of the thirteenth switch S13 and the output terminal 113, the other end of the second capacitor C2 is connected with the other end of the third switch S3, the other end of the eleventh switch S11 and the one end of the seventh switch S7, the other end of the seventh switch S7 is connected with the one end of the third capacitor C3 and the one end of the fourteenth switch S14, the other end of the fourteenth switch S14 is grounded, the other end of the third capacitor C3 is connected with the other end of the fourth switch S4, the other end of the twelfth switch S12 and the one end of the eighth switch S8, the other end of the eighth switch S8 is connected with the one end of the fourth capacitor C4, the other end of the fourth capacitor C4 is connected with the other end of the fifth switch S5 and the other end of the thirteenth switch S13;

the input terminal 111 is used to connect the input power Vin, the control module 130 is connected with the voltage conversion module 110 and is used to control the first switch S1 to the fourteenth switch S14 turned on or off, the voltage conversion module 110 is used to convert the voltage of the input power Vin to different magnifications output voltage and output the corresponding load R from the output terminal 113 when the first capacitor C1, the second capacitor C2, the third capacitor C3 and the fourth capacitor C4 are charging and discharging.

In the present embodiment, the capacitance of the first capacitor C1 is equal to the capacitance of the third capacitor C3, the capacitance of the second capacitor C2 is equal to the capacitance of the fourth capacitor C4, and the capacitance ratio of the first capacitor C1, the second capacitor C2, the third capacitor C3 and the fourth capacitor C4 is 1:2:1:2. For example, the capacitance of the first capacitor C1 and the third capacitor C3 may be 1 uF, the capacitance of the second capacitor C2 and the fourth capacitor C4 may be 2 uF. Be appreciated that, in the alternative embodiments, the second capacitor C2 is formed in parallel by the two first capacitors C1 or the two third capacitors C3, the fourth capacitor C4 is formed in parallel by the two third capacitors C3 or the two first capacitors C1.

In the present embodiment, the control module 130 includes a control 131 and a crystal oscillator (OSC) 133, the control 131 is electrically connected with the OSC 133 and the voltage conversion module 110, the OSC 133 is electrically connected with the voltage conversion module 110, the OSC 133 is used to provide an operation timing signal to the control 131, to trigger the control 131 controlling the first switch S1 to the fourteenth switch S14 turned on or off, further to achieve the charging and discharging operations of the first capacitor C1, the second capacitor C2, the third capacitor C3 and the fourth capacitor C4. Will be appreciated, the voltage conversion circuit 100 further includes a input capacitor Cin and a output capacitor Cout, the one end of the input capacitor Cin is connected with the input terminal 111, the other end is grounded; the one end of the output capacitor Cout is connected with the output terminal 113, the other end is grounded.

Figure 2:
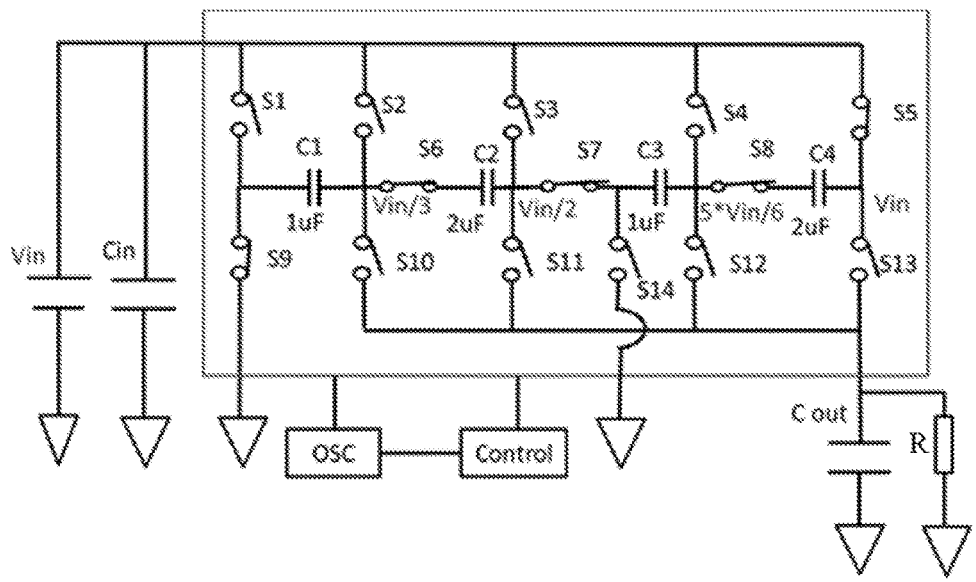
FIG. 2 is a schematic diagram of a first charge state of the voltage conversion circuit of the embodiment of the present disclosure provided.

Please refer to FIG. 2, when the fifth switch S5, the sixth switch S6, the seventh switch S7, the eighth switch S8 and the ninth switch S9 are turned on, and the rest of the switches are turned off, the input power Vin is charging to the first capacitor C1, the second capacitor C2, the third capacitor C3 and the fourth capacitor C4, and forming the first charge state of the voltage conversion circuit. At this time, the first capacitor C1, the second capacitor C2, the third capacitor C3 and the fourth capacitor C4 are connected in series between the positive electrode and ground of the input power Vin through the fifth switch S5, the sixth switch S6, the seventh switch S7, the eighth switch S8 and the ninth switch S9. When the charging of the first capacitor C1, the second capacitor C2, the third capacitor C3 and the fourth capacitor C4 are completed, the voltage of the one end connected between the fourth capacitor C4 and the fifth capacitor C5 and the voltage of the input power Vin are the same, the voltage of the one end connected between the fourth capacitor C4 and the third capacitor C3 is equal to 5/6 times of the voltage of the input power Vin, the voltage of the one end connected between the third capacitor C3 and the second capacitor C2 is equal to ½ times of the voltage of the input power Vin, the voltage of the one end connected between the second capacitor C2 and the first capacitor C1 is equal to ⅓ times of the voltage of the input power Vin.

Figure 3:
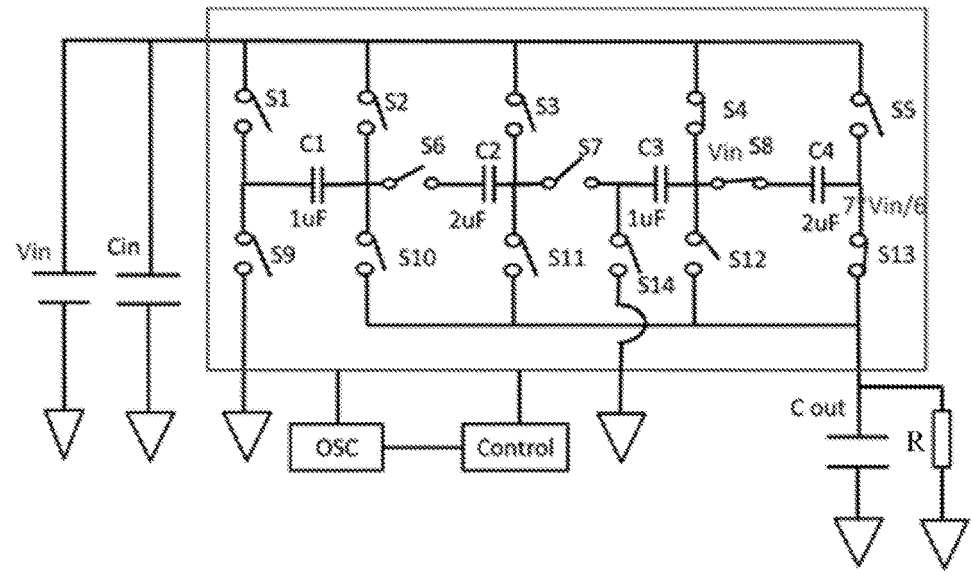
FIG. 3 is a schematic diagram of a first discharge state of the voltage conversion circuit of the embodiment of the present disclosure provided.

Please refer to FIG. 3, based on the first charge state completing the charge of the first capacitor C1, the second capacitor C2, the third capacitor C3 and the fourth capacitor C4, when the fourth switch S4, the eighth switch S8 and the thirteenth switch S13 are turned on, and the rest of the switches are turned off, the first discharge state of the voltage conversion circuit is formed. At this time, the voltage across the fourth capacitor C4 is equal to ⅙ times of the voltage of the input power Vin, the output voltage is equal to 7/6 times of the voltage of the input power Vin. I.e. through the switch of the first charge state and the first discharge state, the voltage conversion circuit may convert the voltage of the input power Vin to the 1.17 times output voltage of the input power Vin.

Figure 4:
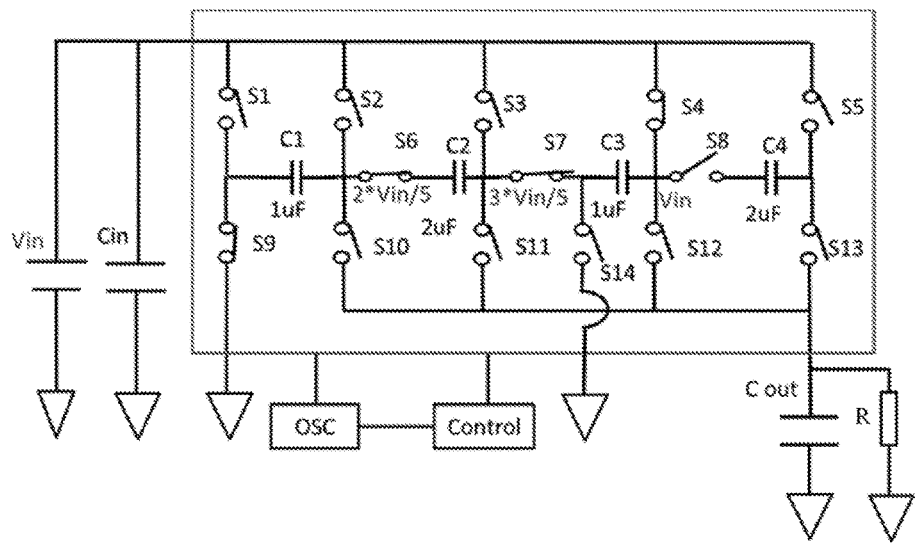
FIG. 4 is a schematic diagram of a second charge state of the voltage conversion circuit of the embodiment of the present disclosure provided.

Please refer to FIG. 4, when the fourth switch S4, the sixth switch S6, the seventh switch S7 and the ninth switch S9 are turned on, and the rest of the switches are turned off, the input power Vin is charging to the first capacitor C1, the second capacitor C2 and the third capacitor C3, the second charge state of the voltage conversion circuit is formed. At this time, the first capacitor C1, the second capacitor C2 and the third capacitor C3 are connected in series between the positive electrode and ground of the input power Vin through the fourth switch S4, the sixth switch S6, the seventh switch S7 and the ninth switch S9. When the charging of the first capacitor C1, the second capacitor C2 and the third capacitor C3 are completed, the voltage of the one end connected between the third capacitor C3 and the fourth switch S4 and the voltage of the input power Vin are the same, the voltage of the one end connected between third capacitor C3 and the second capacitor C2 is equal to ⅗ times of the voltage of the input power Vin, the voltage of the one end connected between the second capacitor C2 and the first capacitor C1 is equal to ⅕ times of the voltage of the input power Vin.

Figure 5:
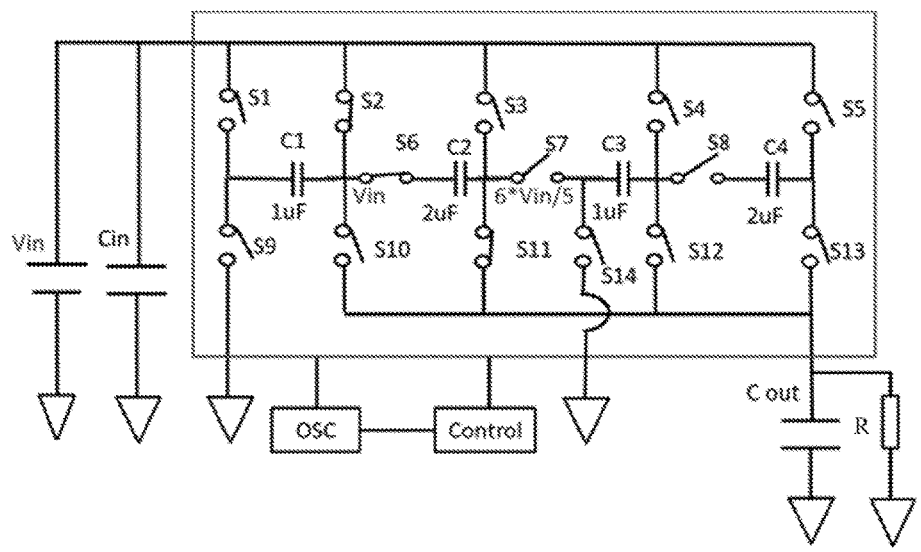
FIG. 5 is a schematic diagram of a second discharge state of the voltage conversion circuit of the embodiment of the present disclosure provided.

Please refer to FIG. 5, based on the second charge state completing the charge of the first capacitor C1, the second capacitor C2 and the third capacitor C3, when the second switch S2, the sixth switch S6 and the eleventh switch S11 are turned on, and the rest of the switches are turned off, the second discharge state of the voltage conversion circuit is formed. At this time, the voltage across the second capacitor C2 is equal to ⅕ times of the voltage of the input power Vin, the output voltage is equal to 6/5 times of the voltage of the input power Vin. I.e. through the switch of the second charge state and the second discharge state, the voltage conversion circuit may convert the voltage of the input power Vin to the 1.2 times output voltage of the input power Vin.

Figure 6:
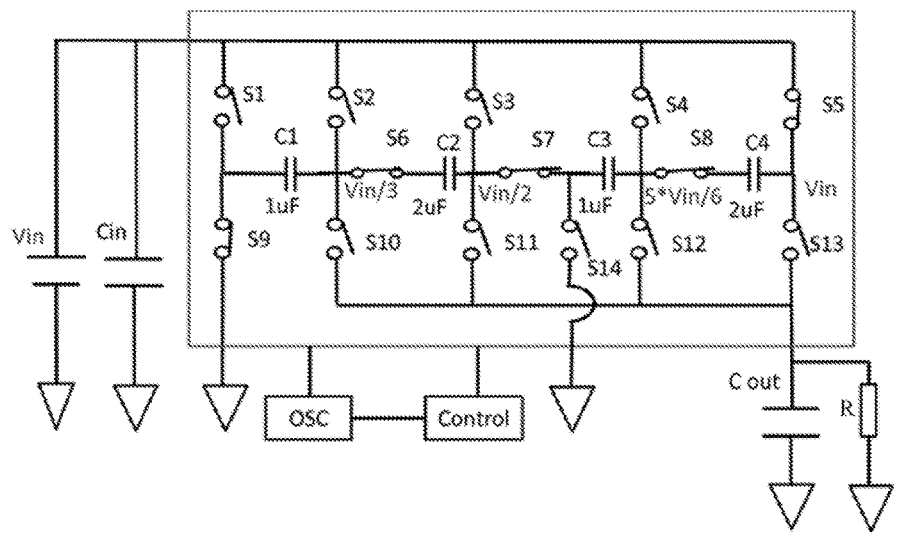
FIG. 6 is a schematic diagram of a third charge state of the voltage conversion circuit of the embodiment of the present disclosure provided.

Please refer to FIG. 6, when the fifth switch S5, the sixth switch S6, the seventh switch S7, the eighth switch S8 and the ninth switch S9 are turned on, and the rest of the switches are turned off, the input power Vin is charging to the first capacitor C1, the second capacitor C2, the third capacitor C3 and the fourth capacitor C4, the third charge state of the voltage conversion circuit is formed. At this time, the first capacitor C1, the second capacitor C2, the third capacitor C3 and the fourth capacitor C4 are connected in series between the positive electrode and ground of the input power Vin through the fifth switch S5, the sixth switch S6, the seventh switch S7, the eighth switch S8 and the ninth switch S9. When the charging of the first capacitor C1, the second capacitor C2, the third capacitor C3 and the fourth capacitor C4 are completed, the voltage of the one end connected between the fourth capacitor C4 and the fifth switch S5 and the voltage of the input power Vin are the same, the voltage of the one end connected between fourth capacitor C4 and the third capacitor C3 is equal to 5/6 times of the voltage of the input power Vin, the voltage of the one end connected between the third capacitor C3 and the second capacitor C2 is equal to ½ times of the voltage of the input power Vin, the voltage of the one end connected between the second capacitor C2 and the first capacitor C1 is equal to ⅓ times of the voltage of the input power Vin.

Figure 7:
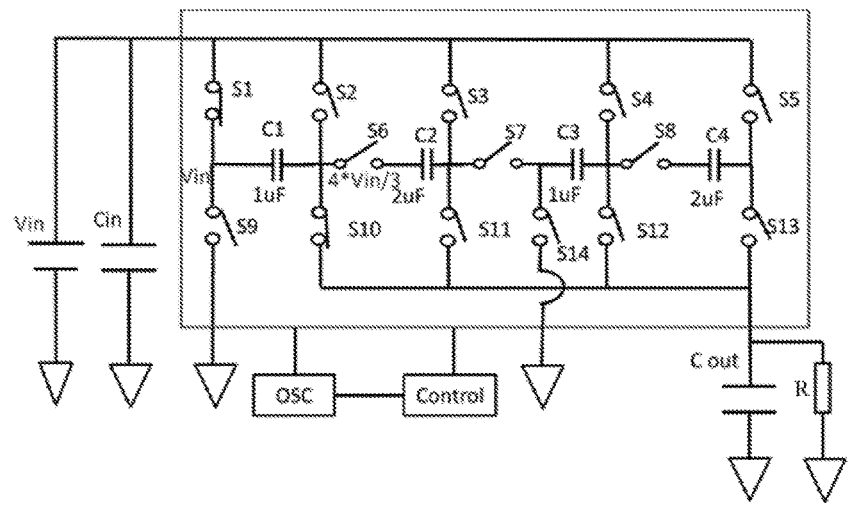
FIG. 7 is a schematic diagram of a third discharge state of the voltage conversion circuit of the embodiment of the present disclosure provided.

Please refer to FIG. 7, based on the third charge state completing the charge of the first capacitor C1, the second capacitor C2, the third capacitor C3 and the fourth capacitor C4, when the first switch S1 and the tenth switch S10 are turned on, and the rest of the switches are turned off, the third discharge state of the voltage conversion circuit is formed. At this time, the voltage across the first capacitor C1 is equal to ⅓ times of the voltage of the input power Vin, the output voltage is equal to 4/3 times of the voltage of the input power Vin. I.e. through the switch of the third charge state and the third discharge state, the voltage conversion circuit may convert the voltage of the input power Vin to the 1.33 times output voltage of the input power Vin.

Figure 8:
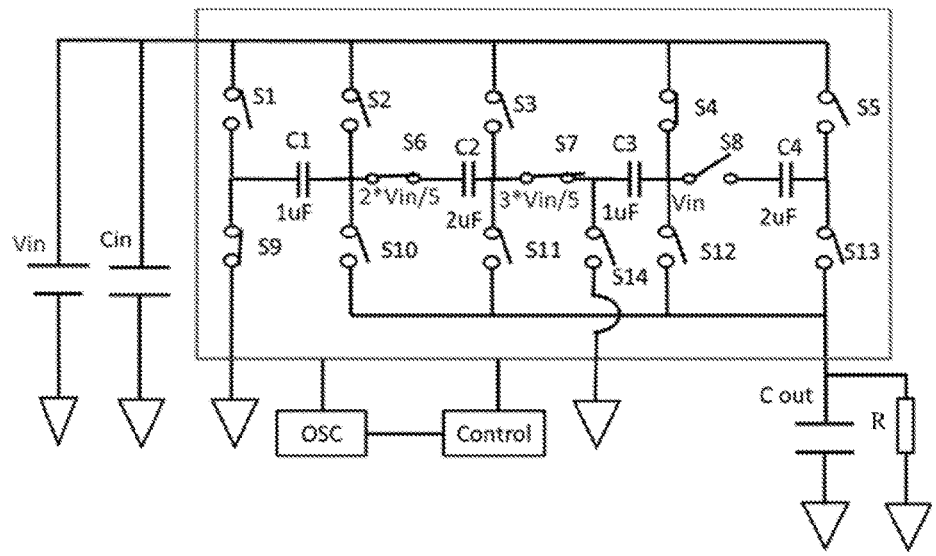
FIG. 8 is a schematic diagram of a fourth charge state of the voltage conversion circuit of the embodiment of the present disclosure provided.

Please refer to FIG. 8, when the fourth switch S4, the sixth switch S6, the seventh switch S7 and the ninth switch S9 are turned on, and the rest of the switches are turned off, the input power Vin is charging to the first capacitor C1, the second capacitor C2 and the third capacitor C3, the fourth charge state of the voltage conversion circuit is formed. At this time, the first capacitor C1, the second capacitor C2 and the third capacitor C3 are connected in series between the positive electrode and ground of the input power Vin through the fourth switch S4, the sixth switch S6, the seventh switch S7 and the ninth switch S9. When the charging of the first capacitor C1, the second capacitor C2 and the third capacitor C3 are completed, the voltage of the one end connected between the third capacitor C3 and the fourth switch S4 and the voltage of the input power Vin are the same, the voltage of the one end connected between third capacitor C3 and the second capacitor C2 is equal to ⅗ times of the voltage of the input power Vin, the voltage of the one end connected between the second capacitor C2 and the first capacitor C1 is equal to ⅕ times of the voltage of the input power Vin.

Figure 9:
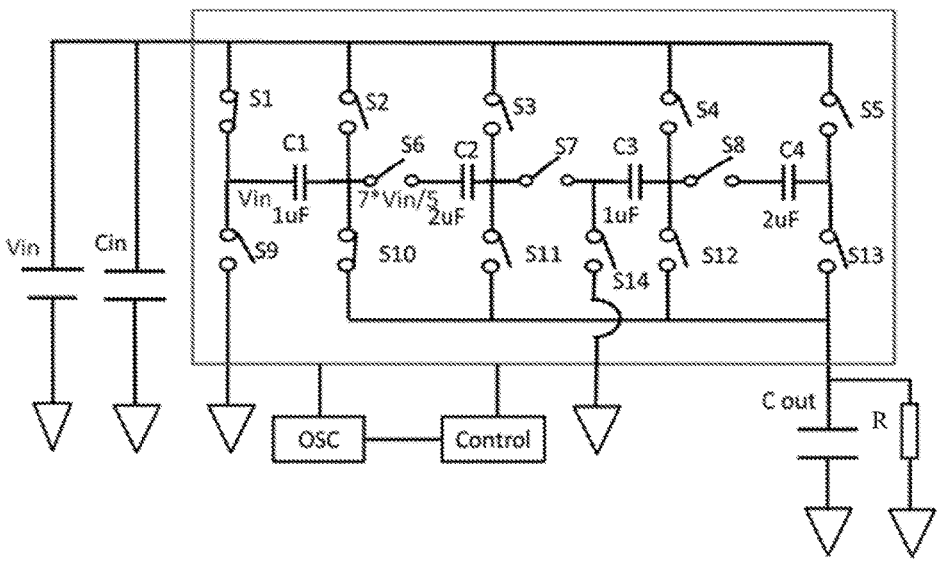
FIG. 9 is a schematic diagram of a fourth discharge state of the voltage conversion circuit of the embodiment of the present disclosure provided.

Please refer to FIG. 9, based on the fourth charge state completing the charge of the first capacitor C1, the second capacitor C2 and the third capacitor C3, when the first switch S1 and the tenth switch S10 are turned on, and the rest of the switches are turned off, the fourth discharge state of the voltage conversion circuit is formed. At this time, the voltage across the first capacitor C1 is equal to ⅖ times of the voltage of the input power Vin, the output voltage is equal to 7/5 times of the voltage of the input power Vin. I.e. through the switch of the fourth charge state and the fourth discharge state, the voltage conversion circuit may convert the voltage of the input power Vin to the 1.4 times output voltage of the input power Vin.

Figure 10:
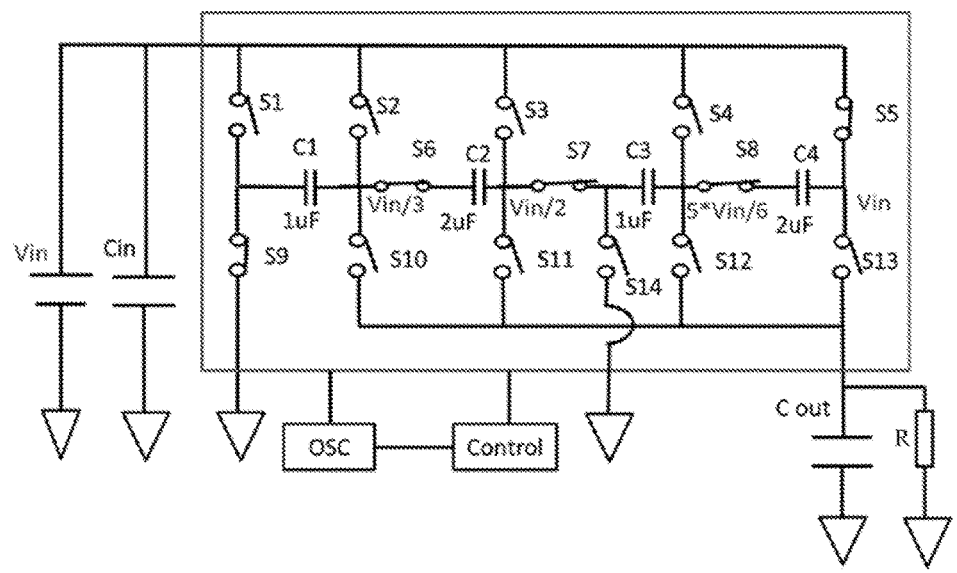
FIG. 10 is a schematic diagram of a fifth charge state of the voltage conversion circuit of the embodiment of the present disclosure provided.

Please refer to FIG. 10, when the fifth switch S5, the sixth switch S6, the seventh switch S7, the eighth switch S8 and the ninth switch S9 are turned on, and the rest of the switches are turned off, the input power Vin is charging to the first capacitor C1, the second capacitor C2, the third capacitor C3 and the fourth capacitor C4, the fifth charge state of the voltage conversion circuit is formed. At this time, the first capacitor C1, the second capacitor C2, the third capacitor C3 and the fourth capacitor C4 are connected in series between the positive electrode and ground of the input power Vin through the fifth switch S5, the sixth switch S6, the seventh switch S7, the eighth switch S8 and the ninth switch S9. When the charging of the first capacitor C1, the second capacitor C2, the third capacitor C3 and the fourth capacitor C4 are completed, the voltage of the one end connected between the fourth capacitor C4 and the fifth switch S5 and the voltage of the input power Vin are the same, the voltage of the one end connected between fourth capacitor C4 and the third capacitor C3 is equal to ⅚ times of the voltage of the input power Vin, the voltage of the one end connected between the third capacitor C3 and the second capacitor C2 is equal to ½ times of the voltage of the input power Vin, the voltage of the one end connected between the second capacitor C2 and the first capacitor C1 is equal to ⅓ times of the voltage of the input power Vin.

Figure 11:
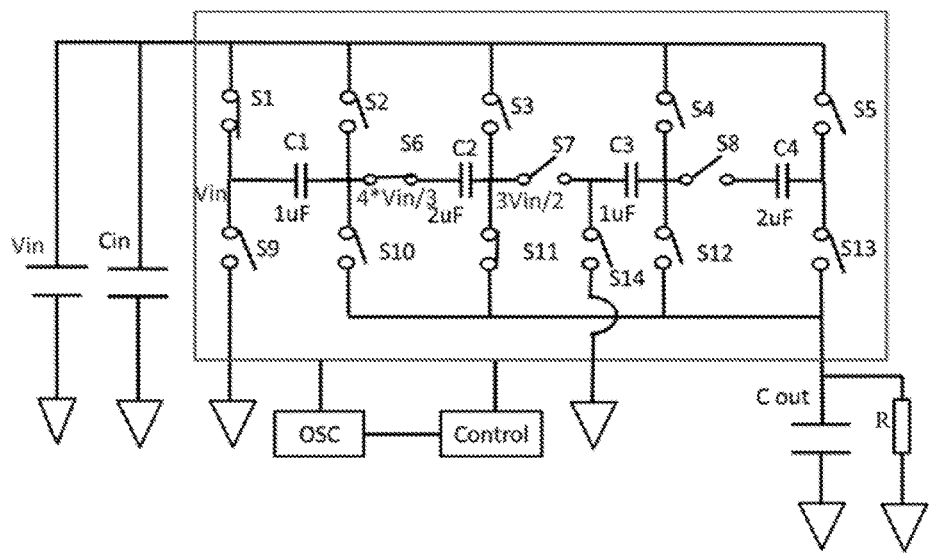
FIG. 11 is a schematic diagram of a fifth discharge state of the voltage conversion circuit of the embodiment of the present disclosure provided.

Please refer to FIG. 11, based on the fifth charge state completing the charge of the first capacitor C1, the second capacitor C2, the third capacitor C3 and the fourth capacitor C4, when the first switch S1, the sixth switch S6 and the eleventh switch S11 are turned on, and the rest of the switches are turned off, the fifth discharge state of the voltage conversion circuit is formed. At this time, the sum of the voltage difference across the first capacitor C1 and the voltage difference across the second capacitor C2 is equal to ½ times of the voltage of the input power Vin, the output voltage is equal to 3/2 times of the voltage of the input power Vin. I.e. through the switch of the fifth charge state and the fifth discharge state, the voltage conversion circuit may convert the voltage of the input power Vin to the 1.5 times output voltage of the input power Vin.

Figure 12:
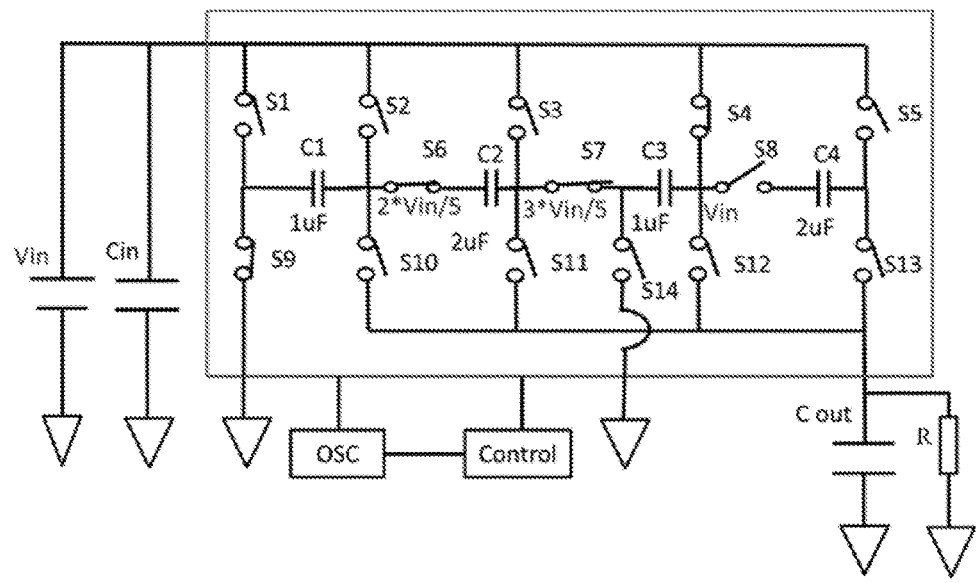
FIG. 12 is a schematic diagram of a sixth charge state of the voltage conversion circuit of the embodiment of the present disclosure provided.

Please refer to FIG. 12, when the fourth switch S4, the sixth switch S6, the seventh switch S7 and the ninth switch S9 are turned on, and the rest of the switches are turned off, the input power Vin is charging to the first capacitor C1, the second capacitor C2 and the third capacitor C3, the sixth charge state of the voltage conversion circuit is formed. At this time, the first capacitor C1, the second capacitor C2 and the third capacitor C3 are connected in series between the positive electrode and ground of the input power Vin through the fourth switch S4, the sixth switch S6, the seventh switch S7 and the ninth switch S9. When the charging of the first capacitor C1, the second capacitor C2 and the third capacitor C3 are completed, the voltage of the one end connected between the third capacitor C3 and the fourth switch S4 and the voltage of the input power Vin are the same, the voltage of the one end connected between third capacitor C3 and the second capacitor C2 is equal to ⅗ times of the voltage of the input power Vin, the voltage of the one end connected between the second capacitor C2 and the first capacitor C1 is equal to ⅕ times of the voltage of the input power Vin.

Figure 13:
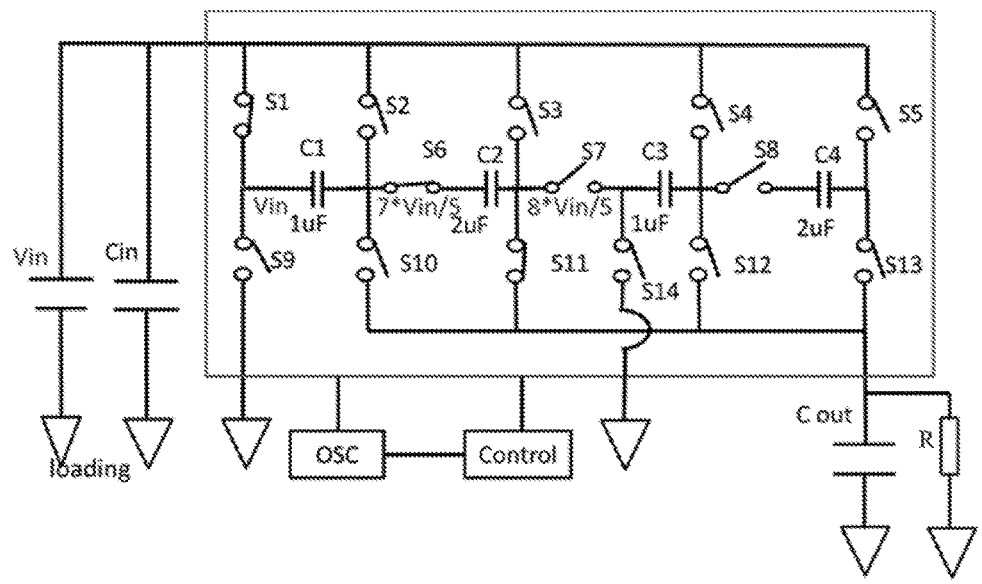
FIG. 13 is a schematic diagram of a sixth discharge state of the voltage conversion circuit of the embodiment of the present disclosure provided.

Please refer to FIG. 13, based on the sixth charge state completing the charge of the first capacitor C1, the second capacitor C2 and the third capacitor C3, when the first switch S1, the sixth switch S6 and the eleventh switch S11 are turned on, and the rest of the switches are turned off, the sixth discharge state of the voltage conversion circuit is formed. At this time, the sum of the voltage difference across the first capacitor C1 and the voltage difference across the second capacitor C2 is equal to ⅗ times of the voltage of the input power Vin, the output voltage is equal to 8/5 times of the voltage of the input power Vin. I.e. through the switch of the sixth charge state and the sixth discharge state, the voltage conversion circuit may convert the voltage of the input power Vin to the 1.6 times output voltage of the input power Vin.

Figure 14:
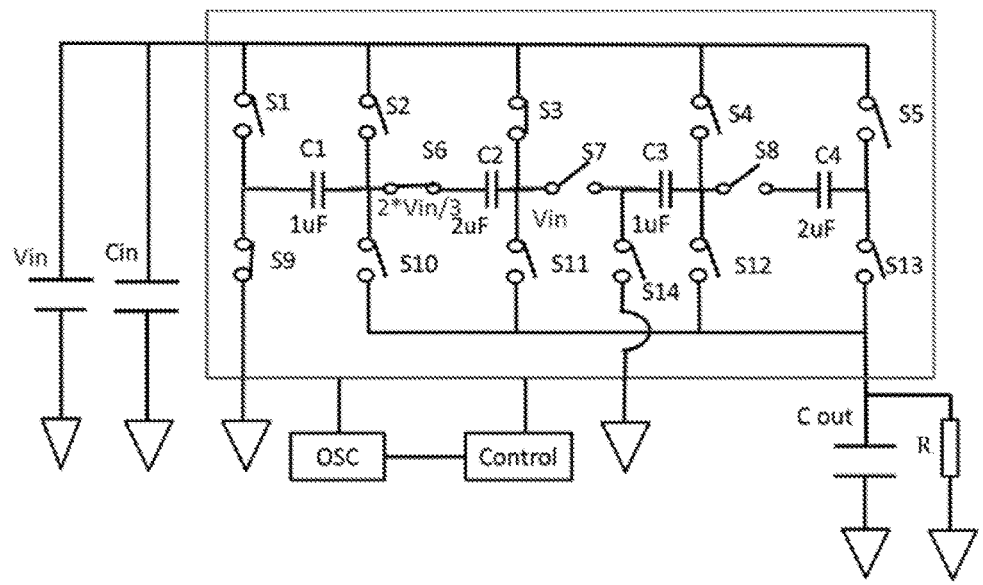
FIG. 14 is a schematic diagram of a seventh charge state of the voltage conversion circuit of the embodiment of the present disclosure provided.

Please refer to FIG. 14, when the third switch S3, the sixth switch S6 and the ninth switch S9 are turned on, and the rest of the switches are turned off, the input power Vin is charging to the first capacitor C1 and the second capacitor C2, the seventh charge state of the voltage conversion circuit is formed. At this time, the first capacitor C1 and the second capacitor C2 are connected in series between the positive electrode and ground of the input power Vin through the third switch S3, the sixth switch S6 and the ninth switch S9. When the charging of the first capacitor C1 and the second capacitor C2 are completed, the voltage of the one end connected between the second capacitor C2 and the third switch S3 and the voltage of the input power Vin are the same, the voltage of the one end connected between second capacitor C2 and the first capacitor C1 is equal to ⅔ times of the voltage of the input power Vin.

Figure 15:
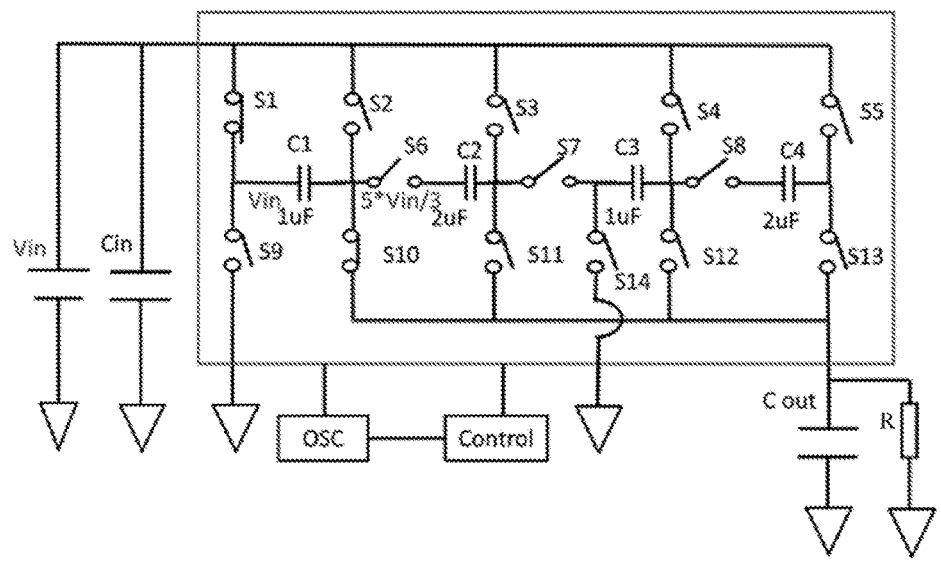
FIG. 15 is a schematic diagram of a seventh discharge state of the voltage conversion circuit of the embodiment of the present disclosure provided.

Please refer to FIG. 15, based on the seventh charge state completing the charge of the first capacitor C1 and the second capacitor C2, when the first switch S1 and the tenth switch S10 are turned on, and the rest of the switches are turned off, the seventh discharge state of the voltage conversion circuit is formed. At this time, the voltage difference across the first capacitor C1 is equal to ⅔ times of the voltage of the input power Vin, the output voltage is equal to 5/3 times of the voltage of the input power Vin. I.e. through the switch of the seventh charge state and the seventh discharge state, the voltage conversion circuit may convert the voltage of the input power Vin to the 1.67 times output voltage of the input power Vin.

Figure 16:
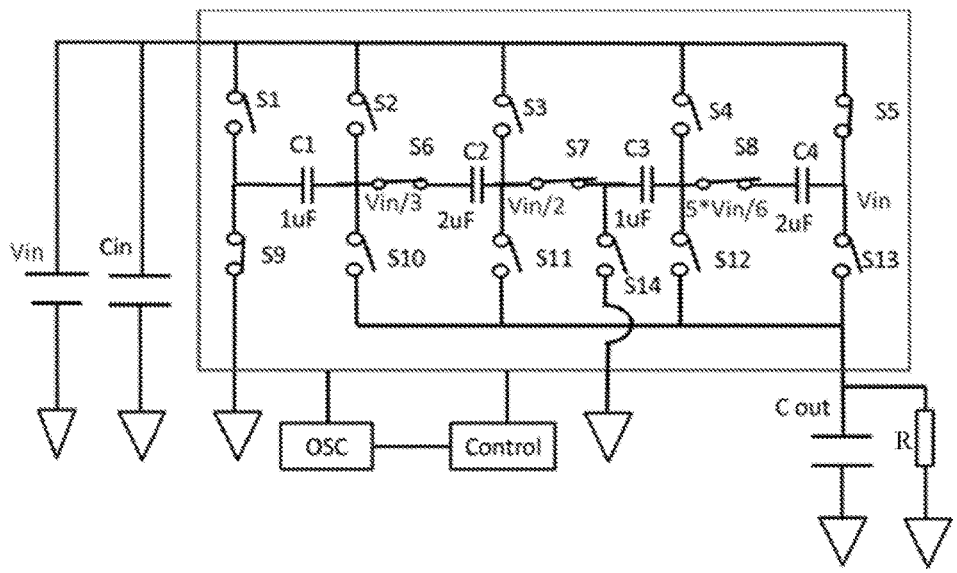
FIG. 16 is a schematic diagram of a eighth charge state of the voltage conversion circuit of the embodiment of the present disclosure provided.

Please refer to FIG. 16, when the fifth switch S5, the sixth switch S6, the seventh switch S7, the eighth switch S8 and the ninth switch S9 are turned on, and the rest of the switches are turned off, the input power Vin is charging to the first capacitor C1, the second capacitor C2, the third capacitor C3 and the fourth capacitor C4, the eighth charge state of the voltage conversion circuit is formed. At this time, the first capacitor C1, the second capacitor C2, the third capacitor C3 and the fourth capacitor C4 are connected in series between the positive electrode and ground of the input power Vin through the fifth switch S5, the sixth switch S6, the seventh switch S7, the eighth switch S8 and the ninth switch S9. When the charging of the first capacitor C1, the second capacitor C2, the third capacitor C3 and the fourth capacitor C4 are completed, the voltage of the one end connected between the fourth capacitor C4 and the fifth switch S5 and the voltage of the input power Vin are the same, the voltage of the one end connected between fourth capacitor C4 and the third capacitor C3 is equal to ⅚ times of the voltage of the input power Vin, the voltage of the one end connected between third capacitor C3 and the second capacitor C2 is equal to ½ times of the voltage of the input power Vin, the voltage of the one end connected between second capacitor C2 and the first capacitor C1 is equal to ⅓ times of the voltage of the input power Vin.

Figure 17:
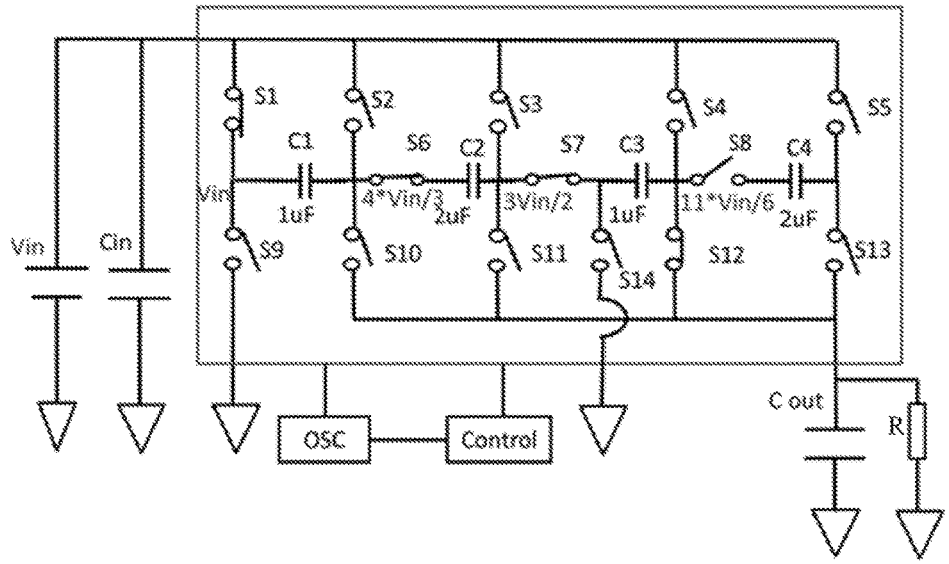
FIG. 17 is a schematic diagram of a eighth discharge state of the voltage conversion circuit of the embodiment of the present disclosure provided.

Please refer to FIG. 17, based on the seventh charge state completing the charge of the first capacitor C1, the second capacitor C2, the third capacitor C3 and the fourth capacitor C4, when the first switch S1, the sixth switch S6, the seventh switch S7 and the twelfth switch S12 are turned on, and the rest of the switches are turned off, the eighth discharge state of the voltage conversion circuit is formed. At this time, the sum of the voltage difference across the first capacitor C1, the voltage difference across the second capacitor C2 and the voltage difference across the third capacitor C3 is equal to ⅚ times of the voltage of the input power Vin, the output voltage is equal to 11/6 times of the voltage of the input power Vin. I.e. through the switch of the eighth charge state and the eighth discharge state, the voltage conversion circuit may convert the voltage of the input power Vin to the 1.83 times output voltage of the input power Vin.

Figure 18:
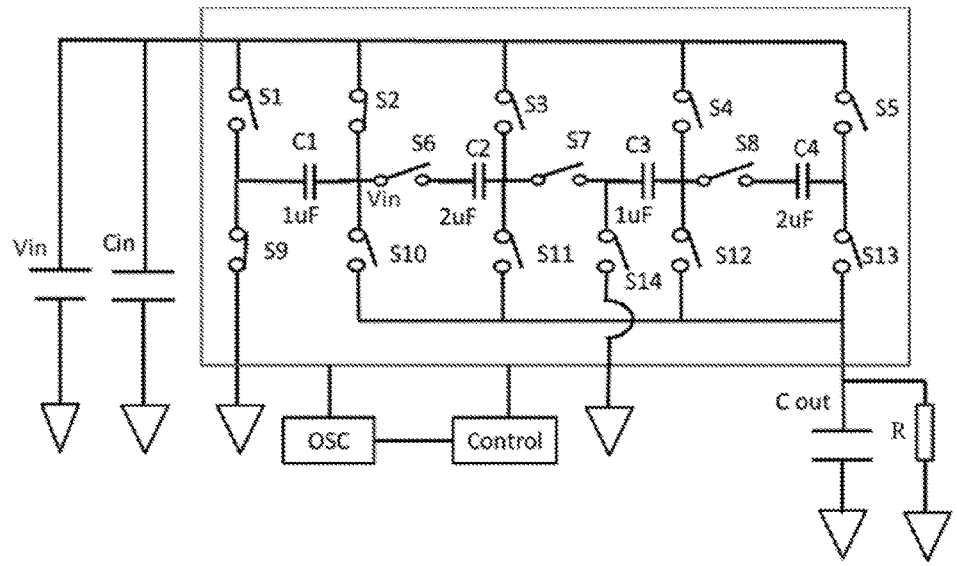
FIG. 18 is a schematic diagram of a ninth charge state of the voltage conversion circuit of the embodiment of the present disclosure provided.

Please refer to FIG. 18, when the second switch S2 and the ninth switch S9 are turned on, and the rest of the switches are turned off, the input power Vin is charging to the first capacitor C1, the ninth charge state of the voltage conversion circuit is formed. At this time, the first capacitor C1 are connected in series between the positive electrode and ground of the input power Vin through the second switch S2 and the ninth switch S9. When the charging of the first capacitor C1 are completed, the voltage of the one end connected between the first capacitor C1 and the second switch S2 and the voltage of the input power Vin are the same.

Figure 19:
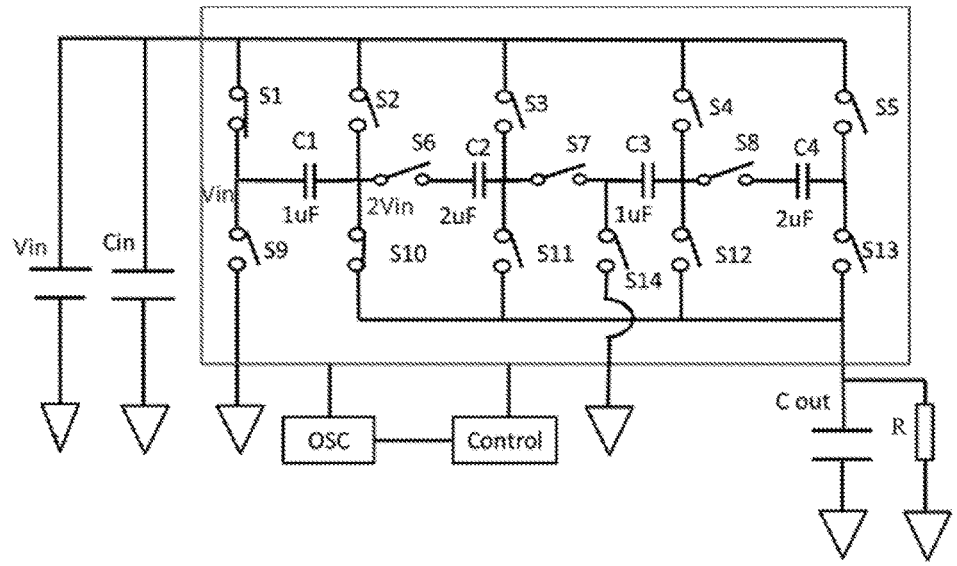
FIG. 19 is a schematic diagram of a ninth discharge state of the voltage conversion circuit of the embodiment of the present disclosure provided.

Please refer to FIG. 19, based on the ninth charge state completing the charge of the first capacitor C1, when the first switch S1 and the tenth switch S10 are turned on, and the rest of the switches are turned off, the ninth discharge state of the voltage conversion circuit is formed. At this time, the voltage difference across the first capacitor C1 is equal to the voltage of the input power Vin, the output voltage is equal to 2 times of the voltage of the input power Vin. I.e. through the switch of the ninth charge state and the ninth discharge state, the voltage conversion circuit may convert the voltage of the input power Vin to the 2 times output voltage of the input power Vin.

Figure 20:
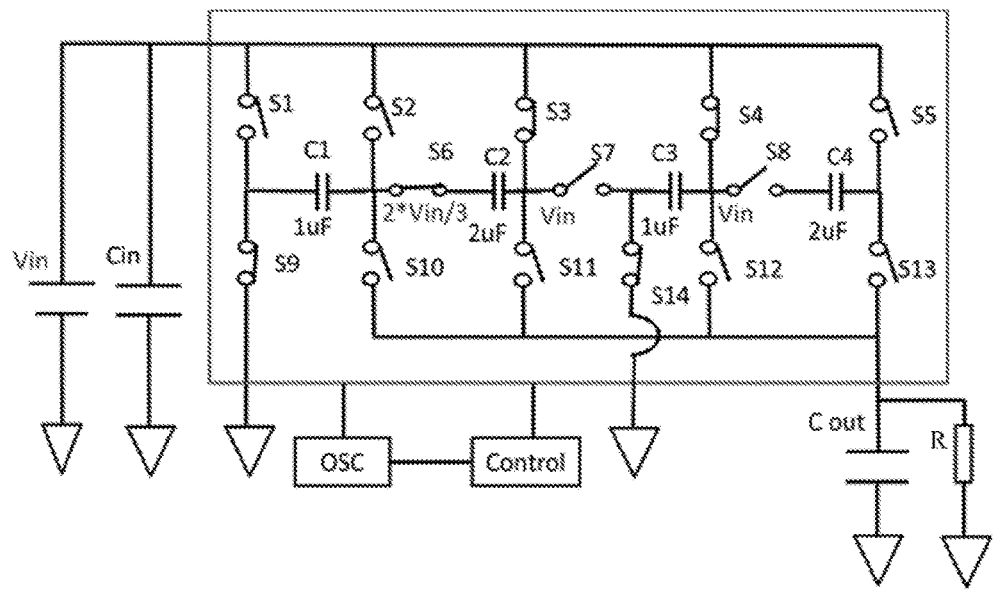
FIG. 20 is a schematic diagram of a tenth charge state of the voltage conversion circuit of the embodiment of the present disclosure provided.

Please refer to FIG. 20, when the third switch S3, the fourth switch S4, the sixth switch S6, the ninth switch S9 and the fourth switch S14 are turned on, and the rest of the switches are turned off, the input power Vin is charging to the first capacitor C1, the capacitor C2 and the third capacitor C3, the tenth charge state of the voltage conversion circuit is formed. At this time, the first capacitor C1 and the second capacitor C2 are connected in series between the positive electrode and ground of the input power Vin through the third switch S3, the sixth switch S6 and the ninth switch S9, the third capacitor C3 is connected in series between the positive electrode and ground of the input power Vin through the fourth switch S4 and the fourteenth switch S14. When the charging of the first capacitor C1, the second capacitor C2 and the third capacitor C3 are completed, the voltage of the one end connected between the third capacitor C3 and the fourth switch S4 and the voltage of the input power Vin are the same, the voltage of the one end connected between the second capacitor C2 and the third switch S3 and the voltage of the input power Vin are the same, the voltage of the one end connected between the second capacitor C2 and the first capacitor C1 is equal to ⅔ times of the voltage of the input power Vin.

Figure 21:
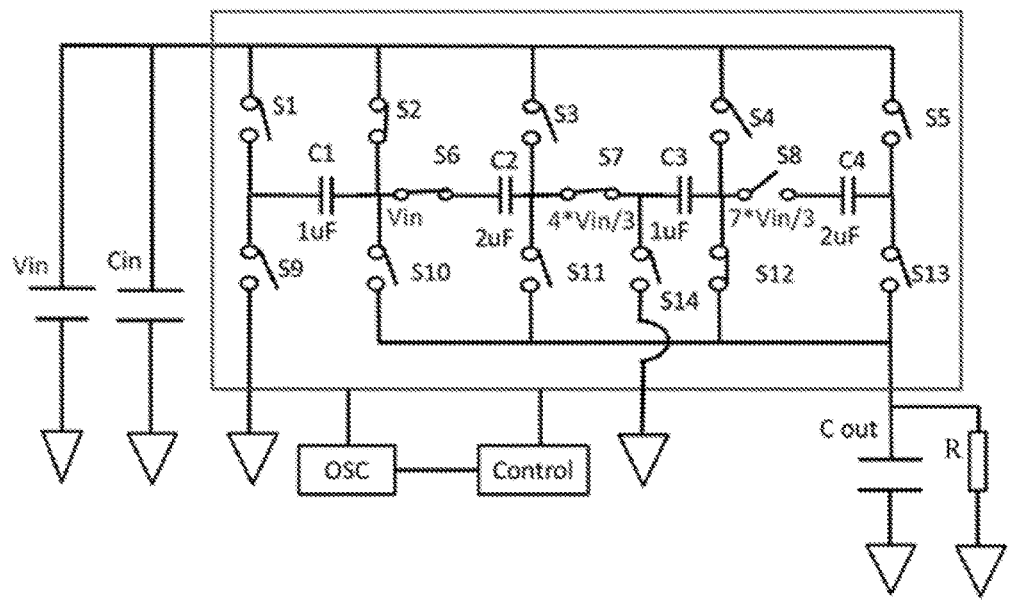
FIG. 21 is a schematic diagram of a tenth discharge state of the voltage conversion circuit of the embodiment of the present disclosure provided.

Please refer to FIG. 21, based on the tenth charge state completing the charge of the first capacitor C1, the second capacitor C2 and the third capacitor C3, when the second switch S2, the sixth switch S6, the seventh switch S7 and the twelfth switch S12 are turned on, and the rest of the switches are turned off, the tenth discharge state of the voltage conversion circuit is formed. At this time, the sum of the voltage difference across the second capacitor C2 and the voltage difference across the third capacitor C3 is equal to 4/3 times of the voltage of the input power Vin, the output voltage is equal to 7/3 times of the voltage of the input power Vin. I.e. through the switch of the tenth charge state and the tenth discharge state, the voltage conversion circuit may convert the voltage of the input power Vin to the 2.33 times output voltage of the input power Vin.

Figure 22:
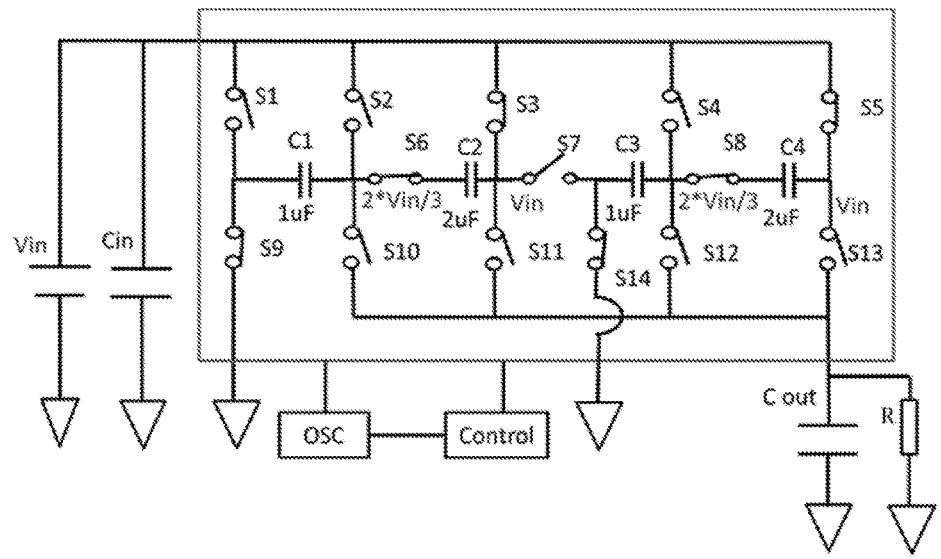
FIG. 22 is a schematic diagram of a eleventh charge state of the voltage conversion circuit of the embodiment of the present disclosure provided.

Please refer to FIG. 22, when the third switch S3, the fifth switch S5, the sixth switch S6, the eighth switch S8, the ninth switch S9 and the fourteenth switch S14 are turned on, and the rest of the switches are turned off, the input power Vin is charging to the first capacitor C1, the capacitor C2, the third capacitor C3 and the fourth capacitor C4, the eleventh charge state of the voltage conversion circuit is formed. At this time, the first capacitor C1 and the second capacitor C2 are connected in series between the positive electrode and ground of the input power Vin through the third switch S3, the sixth switch S6 and the ninth switch S9, the third capacitor C3 and the fourth capacitor C4 are connected in series between the positive electrode and ground of the input power Vin through the fifth switch S5, the eighth switch S8 and the fourteenth switch S14. When the charging of the first capacitor C1, the second capacitor C2, the third capacitor C3 and the fourth capacitor C4 are completed, the voltage of the one end connected between the fourth capacitor C4 and the fifth switch S5 and the voltage of the input power Vin are the same, the voltage of the one end connected between the fourth capacitor C4 and the third capacitor C3 is equal to ⅔ times of the voltage of the input power Vin, the voltage of the one end connected between the second capacitor C2 and the third switch S3 and the voltage of the input power Vin are the same, the voltage of the one end connected between the second capacitor C2 and the first capacitor C1 is equal to ⅔ times of the voltage of the input power Vin.

Figure 23:
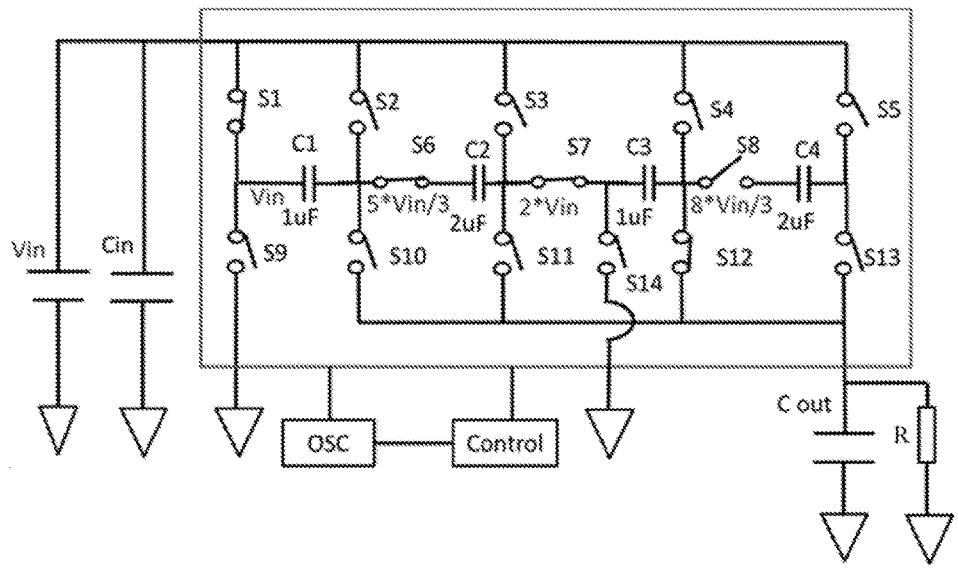
FIG. 23 is a schematic diagram of a eleventh discharge state of the voltage conversion circuit of the embodiment of the present disclosure provided.

Please refer to FIG. 23, based on the eleventh charge state completing the charge of the first capacitor C1, the second capacitor C2, the third capacitor C3 and the fourth capacitor C4, when the first switch S1, the sixth switch S6, the seventh switch S7 and the twelfth switch S12 are turned on, and the rest of the switches are turned off, the eleventh discharge state of the voltage conversion circuit is formed. At this time, the sum of the voltage difference across the first capacitor C1, the voltage difference across the second capacitor C2 and the voltage difference across the third capacitor C3 is equal to 5/3 times of the voltage of the input power Vin, the output voltage is equal to 8/3 times of the voltage of the input power Vin. I.e. through the switch of the eleventh charge state and the eleventh discharge state, the voltage conversion circuit may convert the voltage of the input power Vin to the 2.67 times output voltage of the input power Vin.

Figure 24:
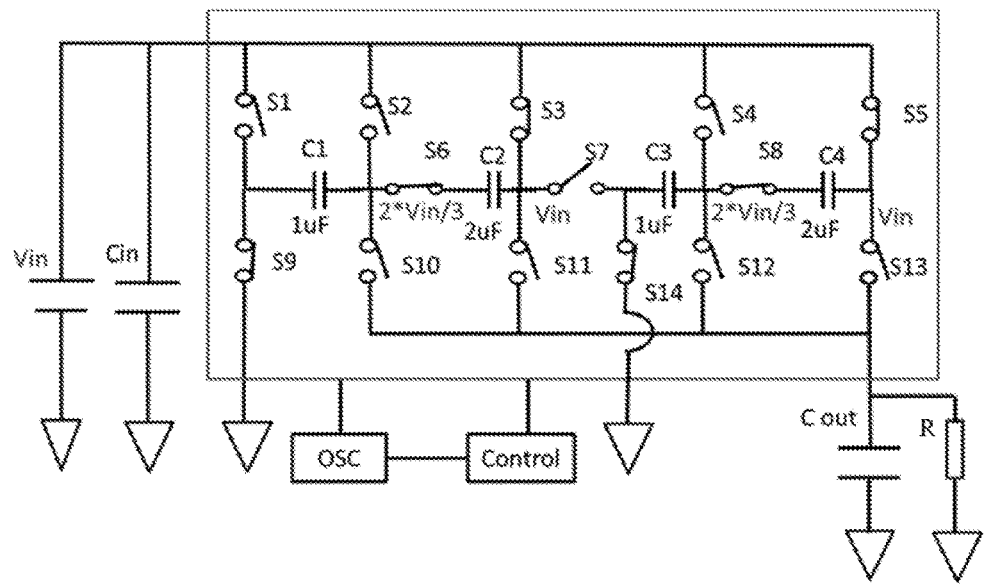
FIG. 24 is a schematic diagram of a twelfth charge state of the voltage conversion circuit of the embodiment of the present disclosure provided.

Please refer to FIG. 24, when the third switch S3, the fifth switch S5, the sixth switch S6, the eighth switch S8, the ninth switch S9 and the fourteenth switch S14 are turned on, and the rest of the switches are turned off, the input power Vin is charging to the first capacitor C1, the capacitor C2, the third capacitor C3 and the fourth capacitor C4, the twelfth charge state of the voltage conversion circuit is formed. At this time, the first capacitor C1 and the second capacitor C2 are connected in series between the positive electrode and ground of the input power Vin through the third switch S3, the sixth switch S6 and the ninth switch S9, the third capacitor C3 and the fourth capacitor C4 are connected in series between the positive electrode and ground of the input power Vin through the fifth switch S5, the eighth switch S8 and the fourteenth switch S14. When the charging of the first capacitor C1, the second capacitor C2, the third capacitor C3 and the fourth capacitor C4 are completed, the voltage of the one end connected between the fourth capacitor C4 and the third capacitor C3 is equal to ⅔ times of the voltage of the input power Vin, the voltage of the one end connected between the second capacitor C2 and the third switch S3 and the voltage of the input power Vin are the same, the voltage of the one end connected between the second capacitor C2 and the first capacitor C1 is equal to ⅔ times of the voltage of the input power Vin.

Figure 25:
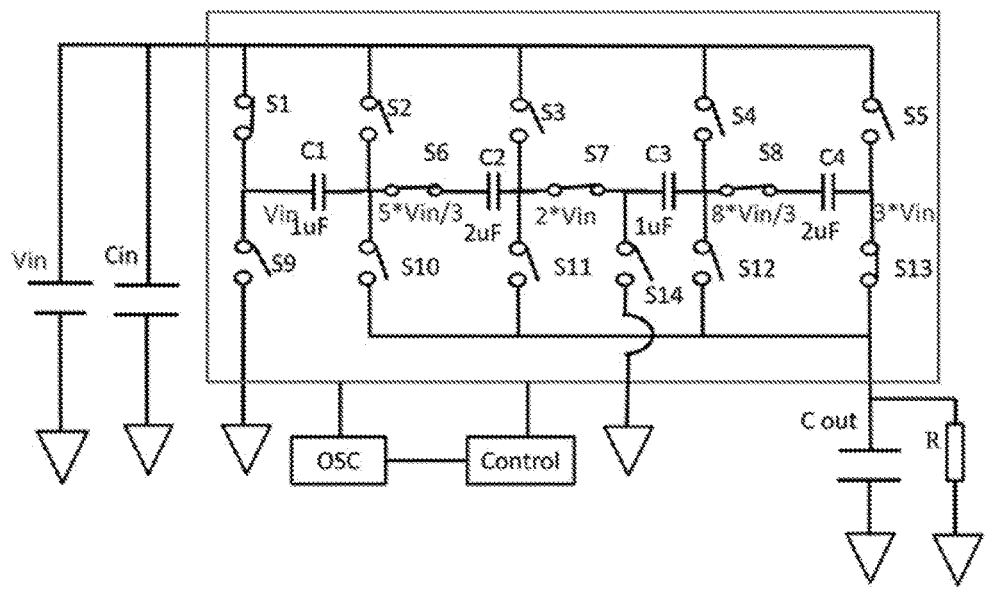
FIG. 25 is a schematic diagram of a twelfth discharge state of the voltage conversion circuit of the embodiment of the present disclosure provided.

Please refer to FIG. 25, based on the twelfth charge state completing the charge of the first capacitor C1, the second capacitor C2, the third capacitor C3 and the fourth capacitor C4, when the first switch S1, the sixth switch S6, the seventh switch S7, the eighth switch S8 and the thirteenth switch S13 are turned on, and the rest of the switches are turned off, the twelfth discharge state of the voltage conversion circuit is formed. At this time, the sum of the voltage difference across the first capacitor C1, the voltage difference across the second capacitor C2, the voltage difference across the third capacitor C3 and the voltage difference across the fourth capacitor C4 is equal to 2 times of the voltage of the input power Vin, the output voltage is equal to 3 times of the voltage of the input power Vin. I.e. through the switch of the twelfth charge state and the twelfth discharge state, the voltage conversion circuit may convert the voltage of the input power Vin to the 3 times output voltage of the input power Vin.

Please refer to FIG. 26, FIG. 26 is twelve switch truth tables of the charge/discharge state shown in FIG. 2 to FIG. 25 of the voltage conversion circuit 100. Wherein, the column mode corresponded is the different 12 output voltages corresponding to the 12 charge/discharge state, the switch truth of the charge/discharge state of the each output voltage corresponded is shown in figure, specific ways may refer to the related description shown in the embodiments from FIG. 2 to FIG. 25, not repeat them here.

The second embodiment of the present disclosure provides a liquid crystal display driving chip including the voltage conversion circuit 100 such as the first embodiment of the present disclosure, the specific structure and functions of the voltage conversion circuit 100 can referend by the related description in the embodiment shown in FIG. 2 to FIG. 25, not repeat them here.

The voltage conversion circuit through arranging the first capacitor, the second capacitor, the third capacitor, the fourth capacitor and the first switch to fourteenth switch, and through the control module controlling the first switch to fourteenth switch turned on or off to achieve the charge and discharge of the first capacitor, the second capacitor, the third capacitor and the fourth capacitor, realized the voltage of the input power converted to a variety of different magnifications of the output voltage, it is conducive to enhancing power conversion efficiency.

Disclosed above is only a preferred embodiment of the present disclosure only, of course, not in order to define the scope of the claimed disclosure, those of ordinary skill in achieving the above embodiments can be understood that all or part of the process, and by It made claims of the disclosure identical change, which is still covered by the scope of the disclosure.

What is claimed is:

1. A voltage conversion circuit comprises a voltage conversion module and a control module;
   the voltage conversion circuit comprises a input terminal, a first capacitor, a second capacitor, a third capacitor, a fourth capacitor, a first switch, a second switch, a third switch, a fourth switch, a fifth switch, a sixth switch, a seventh switch, an eighth switch, a ninth switch, a tenth switch, an eleventh switch, a twelfth switch, a thirteenth switch and a output terminal;
   the one end of the first switch, the second switch, the third switch, the fourth switch and the fifth switch are connected with the input terminal, the other end of the first switch is connected with the one end of the first capacitor and the one end of the ninth switch, the other end of the ninth switch is grounded, the other end of the first capacitor is connected with the other end of the second switch, the one end of the sixth switch and the one end of the tenth switch, the other end of the sixth switch is connected with the one end of the second capacitor, the other end of the tenth switch is connected with the one end of the eleventh switch, the one end of the twelfth switch, the one end of the thirteenth switch and the output terminal, the other end of the second capacitor is connected with the other end of the third switch, the other end of the eleventh switch and the one end of the seventh switch, the other end of the seventh switch is connected with the one end of the third capacitor, the other end of the third capacitor is connected with the other end of the fourth switch, the other end of the twelfth switch and the one end of the eighth switch, the other end of the eighth switch is connected with the one end of the fourth capacitor, the other end of the fourth capacitor is connected with the other end of the fifth switch and the other end of the thirteenth switch;
   the input terminal is used to connect the input power, the control module is connected with the voltage conversion module and is used to control the first switch to the thirteenth switch turned on or off, the voltage conversion module is used to convert the voltage of the input power to different magnifications output voltage and output from the output terminal when the first capacitor, the second capacitor, the third capacitor and the fourth capacitor are charging and discharging.

2. The voltage conversion circuit according to claim 1, wherein, when the fifth switch, the sixth switch, the seventh switch, the eighth switch and the ninth switch are turned on and the rest of the switches are turned off, the input power is charging the first capacitor, the second capacitor, the third capacitor and the fourth capacitor; when the fourth switch, the eighth switch and the thirteenth switch are turned on and the rest of the switches are turned off, the voltage difference across the fourth capacitor is equal to ⅙ times of the voltage of the input power, the output voltage is equal to 7/6 times of the voltage of the input power.

3. The voltage conversion circuit according to claim 1, wherein, when the fourth switch, the sixth switch, the seventh switch and the ninth switch are turned on and the rest of the switches are turned off, the input power is charging to the first capacitor, the second capacitor and the third capacitor; when the second switch, the sixth switch and the eleventh switch are turned on and the rest of the switches are turned off, the voltage difference across the second voltage is equal to ⅕ times of the voltage of the input power, the output voltage is equal to 6/5 times of the voltage of the input power.

4. The voltage conversion circuit according to claim 1, wherein, when the fifth switch, the sixth switch, the seventh switch, the eight switch and the ninth switch are turned on and the rest of the switches are turned off, the input power is charging to the first capacitor, the second capacitor, the third capacitor and the fourth capacitor; when the first switch and the tenth switch are turned on and the rest of the switches are turned off, the voltage difference across the first capacitor is equal to ⅓ times of the voltage of the input power, the output voltage is equal to 4/3 times of the voltage of the input power.

5. The voltage conversion circuit according to claim 1, wherein, when the fourth switch, the sixth switch, the seventh switch and the ninth switch are turned on and the rest of the switches are turned off, the input power is charging to the first capacitor, the second capacitor and the third capacitor; when the first switch and the tenth switch are turned on and the rest of the switches are turned off, the voltage difference across the first capacitor is equal to ⅖ times of the voltage of the input power, the output voltage is equal to 7/5 times of the voltage of the input power.

6. The voltage conversion circuit according to claim 1, wherein, when the fifth switch, the sixth switch, the seventh switch, the eighth switch and the ninth switch are turned on and the rest of the switches are turned off, the input power is charging to the first capacitor, the second capacitor, the third capacitor and the fourth capacitor; when the first switch, the sixth switch and the eleventh switch are turned on and the rest of the switches are turned off, the sum of the voltage difference across the first capacitor and the voltage difference across the second capacitor is equal to ½ times of the voltage of the input power, the output voltage is equal to 3/2 times of the voltage of the input power.

7. The voltage conversion circuit according to claim 1, wherein, when the fourth switch, the sixth switch, the seventh switch and the ninth switch are turned on and the rest of the switches are turned off, the input power is charging to the first capacitor, the second capacitor and the third capacitor; when the first switch, the sixth switch and the eleventh switch are turned on and the rest of the switches are turned off, the sum of the voltage difference across the first capacitor and the voltage difference across the second capacitor is equal to ⅗ times of the voltage of the input power, the output voltage is equal to 8/5 times of the voltage of the input power.

8. The voltage conversion circuit according to claim 1, wherein, when the third switch, the sixth switch and the ninth switch are turned on and the rest of the switches are turned off, the input power is charging to the first capacitor and the second capacitor; when the first switch and the tenth switch are turned on, and the rest of the switches are turned off, the voltage difference across the first capacitor is equal to ⅔ times of the voltage of the input power, the output voltage is equal to 5/3 times of the voltage of the input power.

9. The voltage conversion circuit according to claim 1, wherein, when the fifth switch, the sixth switch, the seventh switch, the eighth switch and the ninth switch are turned on and the rest of the switches are turned off, the input power is charging to the first capacitor, the second capacitor, the third capacitor and the fourth capacitor; when the first switch, the sixth switch, the seventh switch and the twelfth switch are turned on, and the rest of the switches are turned off, the sum of the voltage difference across the first capacitor, the voltage difference across the second capacitor and the voltage difference across the third capacitor is equal to ⅚ times of the voltage of the input power, the output voltage is equal to 11/6 times of the voltage of the input power.

10. The voltage conversion circuit according to claim 1, wherein, when the second switch and the ninth switch are turned on and the rest of the switches are turned off, the input power is charging to the first capacitor; when the first switch and the tenth switch are turned on and the rest of the switches are turned off, the voltage difference across the first capacitor is equal to the voltage of the input power, the output voltage is equal to 2 times of the voltage of the input power.

11. The voltage conversion circuit according to claim 1, wherein, the voltage conversion module further comprises a fourteenth switch, the one end of the fourteenth switch is connected between the third capacitor and the seventh switch, the other end of the fourteenth switch is grounded, the control module is further used to control the fourteenth switch turned on or off.

12. The voltage conversion circuit according to claim 11, wherein, when the third switch, the fourth switch, the ninth switch and the fourteenth switch are turned on and the rest of the switches are turned off, the input power is charging to the first capacitor, the second capacitor and the third capacitor; when the second switch, the sixth switch, the seventh switch and the twelfth switch are turned on and the rest of the switches are turned off, the sum of the voltage difference across the second capacitor and the voltage difference across the third capacitor is equal to 4/3 times of the voltage of the input power, the output voltage is equal to 7/3 times of the voltage of the input power.

13. The voltage conversion circuit according to claim 11, wherein, when the third switch, the fifth switch, the sixth switch, the eighth switch, the ninth switch and the fourteenth switch are turned on, and the rest of the switches are turned off, the input power is charging to the first capacitor, the second capacitor, the third capacitor and the fourth capacitor; when the first switch, the sixth switch, the seventh switch and the twelfth switch are turned on and the rest of the switches are turned off, the sum of the voltage difference across the first capacitor, the voltage difference across the second capacitor and the voltage difference across the third capacitor is equal to 5/3 times of the voltage of the input power, the output voltage is equal to 8/3 times of the voltage of the input power.

14. The voltage conversion circuit according to claim 11, wherein, when the third switch, the fifth switch, the sixth switch, the eighth switch, the ninth switch and the fourteenth are turned on and the rest of the switches are turned off, the input power is charging to the first capacitor, the second capacitor, the third capacitor and the fourth capacitor; when the first switch, the sixth switch, the seventh switch, the eighth switch and the thirteenth switch are turned on and the rest of the switches are turned off, the sum of the voltage difference across the first capacitor, the voltage difference across the second capacitor, the voltage difference across the third capacitor and the voltage difference across the fourth capacitor is equal to 2 times of the voltage of the input power, the output voltage is equal to 3 times of the voltage of the input power.

15. The voltage conversion circuit according to claim 1, wherein, the capacitance of the first capacitor is equal to the capacitance of the third capacitor, the capacitance of the second capacitor is equal to the capacitance of the fourth capacitor, and the capacitance ratio of the first capacitor, the second capacitor, the third capacitor and the fourth capacitor is 1:2:1:2.

16. The voltage conversion circuit according to claim 15, wherein, the second capacitor is formed in parallel by the two first capacitors or the two third capacitors, the fourth capacitor is formed in parallel by the two third capacitors or the two first capacitors.

17. A liquid crystal display driving chip comprises a voltage conversion circuit, the voltage conversion circuit comprises a voltage conversion module and a control module;

the voltage conversion circuit comprises a input terminal, a first capacitor, a second capacitor, a third capacitor, a fourth capacitor, a first switch, a second switch, a third switch, a fourth switch, a fifth switch, a sixth switch, a seventh switch, an eighth switch, a ninth switch, a tenth switch, an eleventh switch, a twelfth switch, a thirteenth switch and a output terminal;

the one end of the first switch, the second switch, the third switch, the fourth switch and the fifth switch are connected with the input terminal, the other end of the first switch is connected with the one end of the first capacitor and the one end of the ninth switch, the other end of the ninth switch is grounded, the other end of the first capacitor is connected with the other end of the second switch, the one end of the sixth switch and the one end of the tenth switch, the other end of the sixth switch is connected with the one end of the second capacitor, the other end of the tenth switch is connected with the one end of the eleventh switch, the one end of the twelfth switch, the one end of the thirteenth switch and the output terminal, the other end of the second capacitor is connected with the other end of the third switch, the other end of the eleventh switch and the one end of the seventh switch, the other end of the seventh switch is connected with the one end of the third capacitor, the other end of the third capacitor is connected with the other end of the fourth switch, the other end of the twelfth switch and the one end of the eighth switch, the other end of the eighth switch is connected with the one end of the fourth capacitor, the other end of the fourth capacitor is connected with the other end of the fifth switch and the other end of the thirteenth switch;

the input terminal is used to connect the input power, the control module is connected with the voltage conversion module and is used to control the first switch to the thirteenth switch turned on or off, the voltage conversion module is used to convert the voltage of the input power to different magnifications output voltage and output from the output terminal when the first capacitor, the second capacitor, the third capacitor and the fourth capacitor are charging and discharging.

18. The LCD driving chip according to claim 17, wherein, the voltage conversion module further comprises a fourteenth switch, the one end of the fourteenth switch is connected between the third capacitor and the seventh switch, the other end of the fourteenth switch is grounded, the control module is further used to control the fourteenth switch turned on or off.

19. The LCD driving chip according to claim 17, wherein, the capacitance of the first capacitor is equal to the capacitance of the third capacitor, the capacitance of the second capacitor is equal to the capacitance of the fourth capacitor, and the capacitance ratio of the first capacitor, the second capacitor, the third capacitor and the fourth capacitor is 1:2:1:2.

20. The LCD driving chip according to claim 19, wherein, the second capacitor is formed in parallel by the two first capacitors or the two third capacitors, the fourth capacitor is formed in parallel by the two third capacitors or the two first capacitors.

* * * * *